US007680733B1

(12) United States Patent
Lundberg

(10) Patent No.: US 7,680,733 B1
(45) Date of Patent: Mar. 16, 2010

(54) COMPUTERIZED PATENT AND TRADEMARK FEE PAYMENT METHOD AND SYSTEM

(75) Inventor: Steven W. Lundberg, Edina, MN (US)

(73) Assignee: Patent and Trademark Fee Management, LLC, Burnsville, MN (US)

(*) Notice: Subject to any disclaimer, the term of this patent is extended or adjusted under 35 U.S.C. 154(b) by 1247 days.

(21) Appl. No.: 09/240,456

(22) Filed: Jan. 29, 1999

Related U.S. Application Data

(63) Continuation-in-part of application No. 08/898,377, filed on Jul. 22, 1997, now Pat. No. 6,363,361.

(51) Int. Cl.
G06Q 40/00 (2006.01)
(52) U.S. Cl. .......................................... 705/40; 705/30
(58) Field of Classification Search .................. 705/34, 705/40, 42, 44, 30, 1, 35; 709/203, 209, 709/217, 224, 231, 235, 237; 707/100, 513, 707/1; 715/513, 715
See application file for complete search history.

(56) References Cited

U.S. PATENT DOCUMENTS

| 5,247,575 | A |   | 9/1993  | Sprague et al.            |
|-----------|---|---|---------|---------------------------|
| 5,465,206 | A |   | 11/1995 | Hilt et al. ......... 705/40 |
| 5,649,117 | A |   | 7/1997  | Landry .............. 705/40 |
| 5,699,528 | A |   | 12/1997 | Hogan ............... 705/40 |
| 5,794,221 | A |   | 8/1998  | Egendorf ............ 705/40 |
| 5,842,185 | A |   | 11/1998 | Chancey et al. ...... 705/40 |
| 5,848,400 | A | * | 12/1998 | Chang ............... 705/35 |
| 5,852,812 | A | * | 12/1998 | Reeder .............. 705/26 |
| 5,864,830 | A |   | 1/1999  | Armetta et al. ...... 705/41 |
| 5,873,072 | A |   | 2/1999  | Kight et al. ........ 705/40 |
| 5,875,431 | A | * | 2/1999  | Heckman et al. ....... 705/7 |

(Continued)

FOREIGN PATENT DOCUMENTS

EP           0527639           2/1993

(Continued)

OTHER PUBLICATIONS

Google Groups, "Plus & Minus Accounting Software from Talyon", May 17, 1995, pp. 1-12.*

(Continued)

*Primary Examiner*—Ella Colbert
(74) *Attorney, Agent, or Firm*—Schwegman Lundberg & Woessner, P.A.

(57) ABSTRACT

An improved computerized method and system for the payment of patent and trademark fees is disclosed. The patent or trademark fee for a client of a firm is charged against an account maintained by an organization separate from the firm. A charge issued at a workstation at the firm is delivered to a patent or patent and trademark agency, or a foreign associate firm, where it is cashed against an account maintained by the separate organization. The firm bills the client for the fee, along with a service charge, while the separate organization bills the firm for the fee and the service charge. Payment from the client to the firm for the fee and service charge is then sent to the separate organization to cover the firm's bill from the separate organization. Recirculating retainers, pre-billing, and other aspects of methods and systems are also disclosed herein.

16 Claims, 24 Drawing Sheets

U.S. PATENT DOCUMENTS

| | | | | |
|---|---|---|---|---|
| 5,920,847 | A | * | 7/1999 | Kolling et al. .................. 705/40 |
| 5,933,817 | A | | 8/1999 | Hucal et al. .................... 705/39 |
| 5,950,174 | A | | 9/1999 | Brendzel ...................... 705/34 |
| 5,960,411 | A | | 9/1999 | Hartman et al. ............... 705/26 |
| 5,991,742 | A | * | 11/1999 | Tran ............................. 705/32 |
| 6,032,133 | A | | 2/2000 | Hilt et al. ....................... 705/40 |
| 6,041,315 | A | | 3/2000 | Pollin .......................... 705/45 |
| 6,044,362 | A | | 3/2000 | Neely ........................... 705/34 |
| 6,070,150 | A | | 5/2000 | Remington et al. ........... 705/34 |
| 6,078,907 | A | | 6/2000 | Lamm ......................... 705/40 |
| 6,192,407 | B1 | | 2/2001 | Smith et al. |
| 6,195,665 | B1 | * | 2/2001 | Jarett ......................... 715/500 |
| 6,292,789 | B1 | | 9/2001 | Schutzer ...................... 705/40 |
| 6,298,335 | B1 | | 10/2001 | Bernstein ..................... 705/40 |
| 6,363,361 | B1 | | 3/2002 | Lundberg |
| 2004/0225607 | A1 | | 11/2004 | Lundberg |
| 2004/0236613 | A1 | | 11/2004 | Lundberg |
| 2004/0267558 | A1 | | 12/2004 | Lundberg |
| 2005/0160036 | A1 | | 7/2005 | Lundberg .................... 705/39 |

FOREIGN PATENT DOCUMENTS

| | | | |
|---|---|---|---|
| WO | WO 96/10235 | * | 4/1996 |
| WO | WO-99/13422 | | 3/1999 |

OTHER PUBLICATIONS

"Pactel's Legal Team had Better get Ready for Some Competition"; Wall Street Journal, Monday, Jul. 24, 1995, p. 1.*

Bellone, R., "A Dozen of the Hottest Verticals", *Accounting Technology*, 12, obtained from http://proquest.umi.com/>, (1996),p. 29-42.

Depree, C.M., et al., "What Are Reasonable Fees and Expenses for Legal Services", *The CPA Journal*, obtained from http://proquest.umi.com/>,(Nov. 1994),4 p.

Evans, C.D., "The Best Legal Software for Paralegals", *Legal Assistant Today*, 13, obtained from http://proquest.umi.com, (May/Jun. 1996),9 p.

Heid, J., "Working Smart, Time-Billing Software", *Macworld*, 11, Obtained from http://proquest.umi.com/>,(Jul. 1994),4 p.

* cited by examiner

Requests...

| Transaction | Status | Date/Time Requested | Account Name | Check#/Auth.# |
|---|---|---|---|---|
| Check | Exported | 07/15/1997 04:09:44 PM | PTFM Checks for U.S. PTO | 1510 |
| Check | Exported | 07/15/1997 03:33:20 PM | PTFM Checks for U.S. PTO | 1509 |
| Authorization | Exported | 07/15/1997 03:24:05 PM | PTFM EPO Deposit Account | 1022 |
| Authorization | Exported | 07/15/1997 03:23:46 PM | PTFM EPO Deposit Account | 1021 |
| Authorization | Exported | 07/15/1997 01:29:21 PM | PTFM EPO Deposit Account | 1020 |
| Check | Exported | 07/15/1997 01:29:07 PM | PTFM Checks for U.S. PTO | 1508 |
| Authorization | Exported | 07/15/1997 01:10:49 PM | PTFM EPO Deposit Account | 1019 |
| Check | Exported | 07/15/1997 01:09:57 PM | PTFM Checks for U.S. PTO | 1507 |
| Authorization | Exported | 06/27/1997 11:33:03 AM | PTFM EPO Deposit Account | 1018 |
| Check | Exported | 06/27/1997 11:31:05 AM | PTFM Checks for U.S. PTO | 1506 |
| Authorization | Exported | 06/24/1997 02:58:17 PM | PTFM EPO Deposit Account | 1017 |
| Check | Exported | 06/24/1997 02:57:55 PM | PTFM Checks for U.S. PTO | 1505 |

Selected 53 records in 0.71 seconds

*FIG. 17*

July 22, 1997  Payee: U.S. Patent & Trademark Office
Fee Code: 101/201 Basic Filing Fee-Utility
Client Number: 00997
Matter Number: xxxx
Note: This requires special attention.

July 22, 1997     $ 2,000.0

Two Thousand AND 0/100 DOLLARS
U.S. Patent & Trademark Office

*FIG. 18*

PTO Management Company Invoice
Invoice Date: July 22, 1997

Item:
  Check Number: 1511
  From Account:
  58-67-9785 – PTFM Checks for U.S. PTO
  Request by:
  Brian Larson                       on: 07/22/1997 12:53:16
  Client Number: 00997               Matter Number: xxxx
  Note: This requires special attention.

|  |  |
|---|---|
| Check Amount: | $ 2,000.0 |
| Fee: | $ 118.75 |
| Total Due By 09/20/1997: | $ 2,118.75 |
| Discounted Total Due If Paid By 08/11/1997: | $ 2,029.69 |
| Discounted Total Due If Paid By 08/11/1997: | $ 2,059.38 |

*FIG. 19*

Deposit Account Authorization

PTFM EPO Deposit Account  Account Number: XYZ234784

Authorization Number: SLWK00021023

| Date | Fee Code | Check Amount |
|---|---|---|
| July 22, 1997 | sdhfsfd | $ 300.0 |

Payee: European Patent Office
Requested by: Brian Larson    on: 07/22/1997 12:44:18
Client Number: 00999
Matter Number: sfgs    Fee Assessed:  $ 6.75

PTO Management Company Invoice

Invoice Date: July 22, 1997

Item:
  Authorization Number: SLWK00021023
  From Account:
  XYZ234784 — PTFM EPO Deposit Account
  Request by:
  Brian Larson    on: 07/22/1997 12:53:16
  Client Number: 00999    Matter Number: xxxx Authorization Amount:  $ 300.0
Fee:  $ 6.75
Total Due By 08/21/1997:  $ 306.75

*FIG. 21*

Activity Report
Schwegman, Lunberg, Woessner & Kluth

Activity for: July 01, 1997 to July 22, 1997

Printed on: July 22, 1997

| Date and Time | Matter | Account | Trans. Type | Check No. | Payee | Amount |
|---|---|---|---|---|---|---|
| Client Number: | 00997 | | | | | |
| 07/15/1997 | 222222 | PTFM Checks for U.S. PTO | Check | 1508 | U.S. Patent & Trademark Office | $ 500.00 DB |
| 07/15/1997 | aewrw | PTFM EPO Deposit Account | Authorization | 1021 | European Patent Office | $ 3,000.00 DB |
| 07/15/1997 | 111 | PTFM Checks for U.S. PTO | Check | 1509 | U.S. Patent & Trademark Office | $ 500.00 DB |
| 07/22/1997 | xxxx | PTFM Checks for U.S. PTO | Check | 1511 | U.S. Patent & Trademark Office | $ 2,000.00 DB |
| | | | | | | $ 6,000.00 DB |
| Client Number: | 00998 | | | | | |
| 07/15/1997 | 222222 | PTFM EPO Deposit Account | Authorization | 1019 | European Patent Office | $ 1,800.00 DB |
| 07/15/1997 | 222222 | PTFM EPO Deposit Account | Authorization | 1020 | European Patent Office | $ 400.00 DB |
| 07/15/1997 | 111111 | PTFM EPO Deposit Account | Authorization | 1022 | European Patent Office | $ 500.00 DB |
| | | | | | | $ 2,750.00 DB |
| Client Number: | 00999 | | | | | |
| 07/15/1997 | 11111 | PTFM Checks for U.S. PTO | Check | 1507 | U.S. Patent & Trademark Office | $ 2,000.00 DB |
| 07/15/1997 | 123141 | PTFM Checks for U.S. PTO | Check | 1510 | U.S. Patent & Trademark Office | $ 460.00 DB |
| 07/22/1997 | sfgs | PTFM EPO Deposit Account | Authorization | 1023 | European Patent Office | $ 300.00 DB |
| | | | | | | $ 2,760.00 DB |
| | | | | | | $ 11,510.00 DB |

FIG. 22

Activity Report
Schwegman, Lunberg, Woessner & Kluth

Activity for: July 01, 1997 to July 22, 1997

Printed on: July 22, 1997

| Date and Time | Client | Matter | Trans. Type | Check No. | Payee | Amount |
|---|---|---|---|---|---|---|
| Account: PTFM Checks for U.S. PTO | | | | | | |
| 07/15/1997 | 00999 | 11111 | Check | 1507 | U.S. Patent & Trademark Office | $ 2,000.00 DB |
| 07/15/1997 | 00997 | 222222 | Check | 1508 | U.S. Patent & Trademark Office | $ 500.00 DB |
| 07/15/1997 | 00997 | 111 | Check | 1509 | U.S. Patent & Trademark Office | $ 500.00 DB |
| 07/15/1997 | 00999 | 123141 | Check | 1510 | U.S. Patent & Trademark Office | $ 460.00 DB |
| 07/22/1997 | 00997 | xxxx | Check | 1511 | U.S. Patent & Trademark Office | $ 2,000.00 DB |
| | | | | | | $ 5,460.00 DB |
| Account: PTFM EPO Deposit Account | | | | | | |
| 07/15/1997 | 00998 | 222222 | Authorization | 1019 | European Patent Office | $ 1,8000.00 DB |
| 07/15/1997 | 00998 | 222222 | Authorization | 1020 | European Patent Office | $ 400.00 DB |
| 07/15/1997 | 00997 | aewrw | Authorization | 1021 | European Patent Office | $ 3,000.00 DB |
| 07/15/1997 | 00998 | 11111 | Authorization | 1022 | European Patent Office | $ 550.00 DB |
| 07/22/1997 | 00999 | sfgs | Authorization | 1023 | European Patent Office | $ 300.00 DB |
| | | | | | | $ 6,050.00 DB |
| | | | | | | $ 11,510.00 DB |

FIG. 23

COMPUTERIZED PATENT AND TRADEMARK FEE PAYMENT METHOD AND SYSTEM

RELATED APPLICATIONS

The present application is a continuation-in-part to the coassigned application entitled "COMPUTERIZED PATENT AND TRADEMARK FEE PAYMENT METHOD AND SYSTEM," Ser. No. 08/898,377 filed on Jul. 22, 1997, now U.S. Pat. No. 6,363,361 which is hereby incorporated by reference.

FIELD OF THE INVENTION

This invention relates generally to a computerized method and system for the payment of patent and trademark fees, and more specifically to such a computerized method and system in which a patent or trademark fee for a client of a firm is charged against an account maintained by an organization separate from the firm.

BACKGROUND OF THE INVENTION

When a patent or trademark application is filed with a patent or trademark agency, such as the United States Patent and Trademark Office (USPTO), the filing is accompanied by a fee payable to the patent or trademark agency. This fee covers the agency's cost in reviewing and examining the filing. For example, in the case where the filing is a patent application, the fee covers the cost incurred by the agency in determining whether the application should issue as a patent.

Typically, a law firm pays the patent and trademark fees itself on behalf of its clients, and bills the fees as disbursements, or asks for and receives from the clients a retainer to use to pay the fees. Patent fees especially, however, have continued to increase greatly in the past few years. For law firms having a majority of clients that do not provide retainers, this means that such law firms have had to increasingly advance a large amount of their working capital as patent and trademark fees, which might not be paid back from their clients for a number of months, if ever.

In addition, the increasing popularity of Patent Cooperation Treaty (PCT) international patent applications has also resulted in law firms having to advance even more of their capital as patent and trademark fees on behalf of their clients. In the past, most international applications were filed directly in a desired foreign country, or in the European Patent Office. A foreign associate was thus responsible for the payment of any associated patent or trademark fees. While the law firm would still have to pay the foreign associate even if the client did not pay the law firm, this practice allowed the law firm some time to collect the fees from the client first, before paying the foreign associate. Thus, in many cases, the firm did not have to resort to its capital to pay for these expenses.

However, in the case of a PCT filing, a law firm must now immediately advance filing fees that are usually on the order of several thousands of dollars. These fees are paid out of the law firm's own working capital. Because PCT applications have grown in popularity, PCT application fees are a large cash flow burden on patent and trademark law firms. Along with the increased fees for patent and trademark filings in general, the popularity of PCT applications have frequently strained the working capital of many law firms.

Adding to this strain for United States patent and trademark firms is a rule by the United States Internal Revenue Service (IRS) that prohibits patent and trademark firms from deducting the payment of USPTO and PCT fees from earnings as a business expense. Instead, the payment of these fees is treated as a loan to a firm's clients, and is not deductible. This rule has resulted in a fiscal year-end tax and cash flow problem in itself for patent and trademark law firms.

That is, the rule means that firms cannot retain earnings to cover the capital advanced on behalf of their clients to the USPTO. Because the firms still need to have capital on hand to cover the patent and trademark fees, however, they are typically left with no other option but to pay in more working capital, or to borrow the money advanced for clients from a lending institution.

In addition, ethical considerations as codified in the rules of ethics of most states' legal bars may prevent or restrict the extent to which patent and trademark law firms can collect interest on the advancement of these fees. The typical patent and trademark law firm thus finds itself in a position in which it is forced to loan capital to its clients interest-fee to pay for patent and trademark fees advanced on behalf of the clients. As these fees have substantially increased, and as PCT applications with their high fees have grown in popularity, the typical law firm thus finds itself resorting to ever-increasing bank loans to cover shortfalls created by the advancement of these fees, increasing the firm's internal cost of doing business.

Furthermore, this problem also extends to the payment of fees for professional services of foreign associates. An American law firm requires such foreign associates so that it may file foreign patent and trademark applications on behalf of its clients in other countries. Similar to fees paid to patent and trademark agencies, foreign associate fees are billed to the law firm, which then may be forced to pay them before it receives renumeration from the clients with which the fees are associated. Thus, the typical law firm also may find itself resorting to bank loans to cover shortfalls created by advancement of foreign associate fees, in addition to patent and trademark agency fees.

SUMMARY OF THE INVENTION

The above-mentioned shortcomings and needs are addressed technologically by the present invention, which will be understood by reading and studying the following specification. The present invention describes a computerized method and system for the payment of patent and trademark fees. Specifically, the invention describes such a computerized method and system in which a patent or trademark fee for a client of a firm is charged against an account maintained by an organization separate from the firm.

In one embodiment of the invention, a computerized system comprises three computer systems: a firm computer system, a fee computer system, and an account computer system. The firm computer system is maintained by a firm such as a law firm. A charge for a patent or trademark fee for a particular client, such as a check or an authorization to debit a deposit account, is issued at the firm computer system. The firm computer system stores data representing first information regarding the charge, such as the amount and date of the charge, the client and matter for which the fee was paid, etc.

The fee computer system is maintained by an organization separate from the law firm. The fee computer system is receptive to electronic transmission of the data representing the first information regarding the charge from the firm computer system, such as via modem or over the Internet. The organization maintaining the fee computer system holds an account with a financial institution or a patent or patent and trademark agency against which the charge is payable.

The account computer system is maintained by the financial institution or the patent or patent and trademark agency. This computer system stores data representing the account held by the organization maintaining the fee computer system. The account computer system generates a statement including second information regarding the charge, also such as the amount and date of the charge, etc.

Data representing this second information is input into the fee computer system. The fee computer system then reconciles the second information regarding the charge with the first information regarding the charge. The fee computer system generates a statement or an invoice to bill the firm for the charge, plus a service fee, while the firm computer system generates an invoice to bill the client for the charge and the service fee.

Because, for example, the firm may have to repay the organization (typically a financing organization) in ninety days, while the client may have to repay the firm in sixty days, the firm does not have to advance money on behalf of the client for patent and trademark fees. The law firm issues a charge (a check or authorization to debit) payable to a patent or patent and trademark agency such as the USPTO, but the charge is payable against an account maintained by the (financing) organization, to not the firm. The firm thus has time to collect the payment of patent and trademark fees from its clients prior to repaying the (finance) organization. Furthermore, the organization is amenable to providing this service, because it is able to charge a service charge passed along to the firm's clients. Because the organization is not a patent and trademark law firm, the organization is free to charge a service charge in conjunction with the loaning of money.

In another embodiment of the invention, a computer-implemented method for managing patent and trademark fees includes issuing a charge for a requested fee for transmittal to an agency such as the U.S. Patent and Trademark Office (PTO), where the charge is payable against an account maintained by an organization separate from a firm. The account is for a client of the firm, and is initially funded by the client so that it has a positive balance. Thereafter, a client invoice is generated, including the charge for the requested fee, to replenish the account maintained by the organization—so that upon payment by the client, the account continually retains a positive balance. This sort of retainer system is referred to as a "recirculating retainer," and provides at least some embodiments of the invention with advantages not found in the prior art.

In another embodiment of the invention, notice of an event for a matter of a client of a firm is received, where the event will require a fee associated with the matter for payment to an agency such as the U.S. PTO by a due date. A client invoice is generated, including a charge for the requested fee to pre-fund an account maintained for the client by an organization separate from the firm. Thus, upon payment by the client prior to the due date, the account has a sufficient positive balance to cover the fee. This is referred to as "pre-billing," and provides at least some embodiments of the invention with advantages not found in the prior art.

In different embodiments of the invention, methods and systems of varying scope are described. Still other and further aspects, advantages and embodiments of the present invention will become apparent by reference to the drawings and by reading the following detailed description.

BRIEF DESCRIPTION OF THE DRAWINGS

FIG. 3(d) shows a flowchart of a tracking embodiment of the invention;

FIGS. 8, 9, 10, 11, 12, 13, 14, 15, 16 and 17 show screen shots from an exemplary embodiment of the invention; and, FIGS. 18, 19, 20, 21, 22 and 23 show forms and reports from an exemplary embodiment of the invention.

DETAILED DESCRIPTION OF THE INVENTION

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only be the appended claims.

A First Preferred Computerized Method of the Invention

Figure 1A:
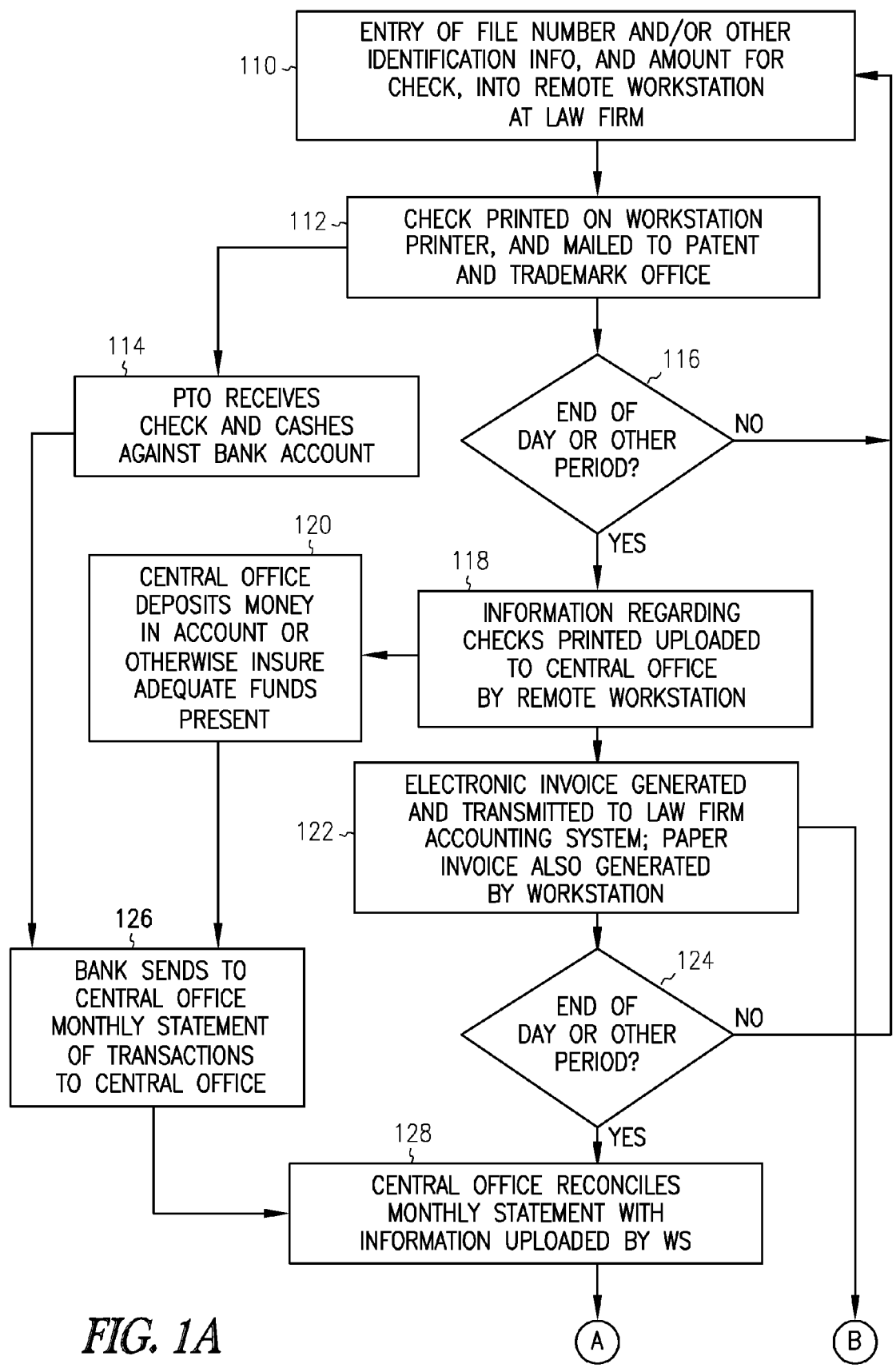
FIG. 1(a) and FIG. 1(b) show a flowchart of a first preferred computerized method of the invention.
Figure 1B:
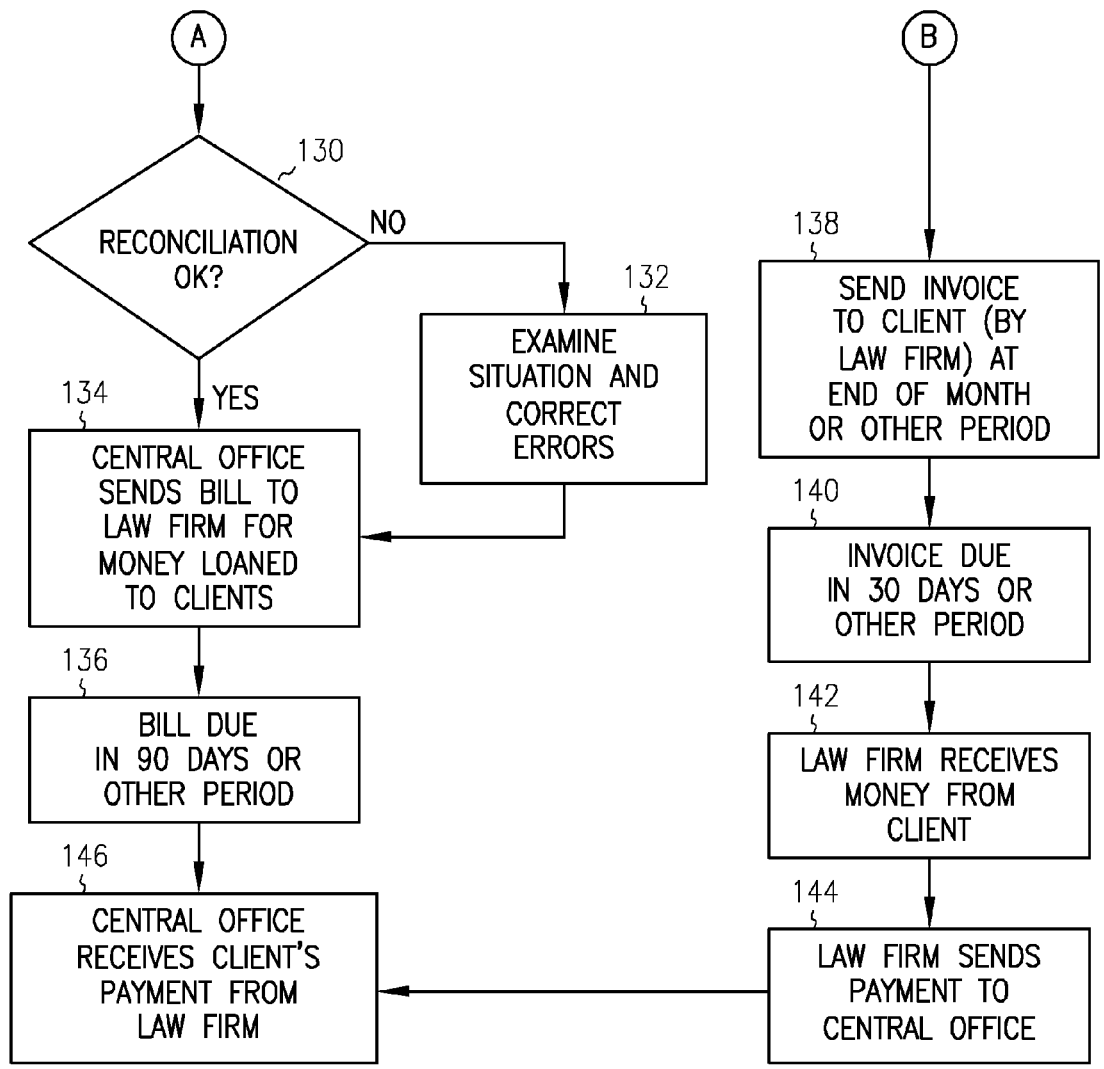

Referring to FIG. 1(a) and FIG. 1(b), a first preferred computerized method of the invention is shown. In the first preferred computerized method, a law firm computer system prints checks for the payment of patent and trademark fees on behalf of its clients, the checks payable to a patent or patent and trademark agency (such as the USPTO) and against a financial account held by a separate financing organization. Thus, the law firm does not advance its own funds on behalf of its clients to pay trademark and patent fees.

In step 110, identification information regarding a particular patent or trademark fee is entered into a workstation at the law firm. This workstation may be a computer used only for this purpose, or it may be any networked computer in the office also used for other purposes (for example, a computer in an attorney or paralegal's office that is also used for word processing, etc.). The information entered into the workstation regarding the particular fee preferably includes the amount of the fee, the payee patent or patent and trademark agency of the fee (for example, the USPTO, the European Patent Office (EPO), etc.), and the client and matter number for which the fee is being requested. Other information may also be included.

In step 112, a check is printed on a printer coupled to the workstation. The printer may be a stand-alone printer especially dedicated for the purpose of printing such checks. Alternatively, the printer may be a network printer. The printed check includes the current date, a check number, the amount of the fee, and the payee patent or patent and trademark agency of the fee. The check is mailed along with its associated filing (for example, a patent application, or an office action response) to the payee patent or patent and trademark agency. The checks may be printed as they are requested, or they may be printed as a batch job once during a predetermined period, such as once daily, twice daily, etc.

In an alternative embodiment, the check requested at step 110 may not be printed until a requested period of time, in which case it may be printed remotely, at the financing organization. For example, for a foreign associate fee, such a fee may not be due for a number of months, such as six months from the current date. However, in step 110, a check request may be made that a check for the fee be issued four months from the current date (two months prior to the due date of the foreign associate fee). When the issue date arrives, the check is printed remotely at the financing organization, and mailed directly to the foreign associate, or alternatively to the firm for mailing to the foreign associate. Note that the invoicing of this charge, as invoicing is later described in this section of the detailed description, may nevertheless be performed immediately, such that the client pays the firm for the foreign associate fee even before the financing organization cuts a check to pay the foreign associate.

In step 114, the payee patent or patent and trademark agency receives the check, and cashes it against a bank account maintained by the separate financing organization with a banking or other financial institution. Thus, the patent or trademark fee is initiated at the law firm workstation (in step 110), but is actually paid for by the separate financing organization. The law firm does not advance fees from its own working capital.

The process of the entry of a check request in step 110 and a check being printed and mailed in step 112 (for ultimate receipt and cashing by the patent or patent and trademark agency in step 114) is repeated as needed within a first predetermined period, such as a day. This is represented by step 116. If the end of the day or other first predetermined period has not been reached, the process reverts back to step 110. Thus, in a given day, a number of checks may be requested, printed and mailed.

Once the end of the day or other first predetermined period is reached, however, the process continues to step 118. In step 118, first information regarding the checks printed during that day or other first predetermined period is electronically transmitted to the financing organization's fee computer system. This may be accomplished by a modem at the workstation communicating with a modem at the fee computer system, or over the Internet, assuming that both the workstation and the fee computer system are so connected to the Internet. The invention is not limited to the manner by which electronic transmission is effectuated. For example, in another embodiment, the information is saved onto magnetic media, such as a diskette, and physically moved from one workstation to the fee computer system. The first information preferably includes for each check the date of the check, the amount of the check, the payee of the check, and the number of the check. Other information may also be included.

In step 120, the financing organization deposits, preferably electronically via the fee computer system, enough money in its account to cover the amounts of the checks issued during that day or other first predetermined period. Assuming a daily period, this provides sufficient time for the financing organization to deposit funds to cover the checks issued. For example, if on day one the law firm issues nine checks totaling $10,000 in repeated steps 110 and 112, first information regarding the nine checks will be uploaded to the financing organization's fee computer system in step 118 at the end of day one, and the financing organization will be able to deposit sufficient funds to cover the checks no later than the beginning of day two. Even if the checks are mailed via next-day mail to the patent or patent and trademark agency in step 112, by the time the patent or patent and trademark agency receives and cashes the checks on day two in step 114, the funds will already have been deposited by the financing organization into the account in step 120.

In step 122, the workstation at the law firm generates, also at the end of each day or other first predetermined period, for each check an electronic fee invoice (a first invoice; note that the different invoices described in selected sections of the detailed description are numbered to clarify the particular invoice being described, and to permit easy distinction among the different particular invoices) and transmits it to the firm's accounting system. A paper invoice (a second invoice) for verification purposes is also generated—i.e., printed on a printer coupled to the workstation. Each electronic (first) invoice preferably includes the amount of the check, the date of the disbursement of the check, the payee patent or patent and trademark agency of the check, the check number, and the client and matter associated with the check. While these second invoices, while described as being daily, may in fact be generated at the end of each day, as has been described, or at the same time as each check is printed.

Optionally, this invoice is printed with the check at step 112 on one part of a multi-part check; furthermore, optionally, only the first or second invoice (not both) is generated. That is, the daily (second) invoices are integrated into the check itself. Thus, in a single printing the check is issued, along with a separable check stub and invoice. The stub and invoice may be separable via perforated paper, although the invention is not so limited. The accounting system may be connected to the same local-area or other network as is the workstation, or may be directly connected to the workstation, etc. The invention is not so limited.

The invoice may also be a peel-off receipt or carbon that is obtained from each transmittal in conjunction with which a check has been printed. These peel-off receipts or carbons can thus be tracked, and can be used to manually enter in the invoice information into the firm's accounting system and for ultimate uploading to the financing organization. That is, the invention also contemplates the manual entry and tabulation of individual checks that are printed. Furthermore, an adhesive label may be generated, to stick to the matter file in conjunction with which the charge was advanced, such that the label serves as later proof of authorization of a check.

Therefore, the invoice printed in step 122 may be separate from the printed check, or may be part of the check form itself. Having the invoice as part of the check itself is useful in that the invoice may be a check "stub," which is easily removed from the check. Thus, the check may remain with the invoice until just prior to mailing, at which time the invoice is torn from the check. Alternatively still, the check form may be have two copies of the invoice, in the case of a three-part check.

The daily or other first predetermined period uploading of first information regarding the checks issued in step 118, the daily or other first predetermined period depositing of funds by the financing organization to cover the checks issued in step 120, and the daily or other first predetermined period generation of an electronic (first) and paper (second) invoice by the workstation and corresponding transmission to the firm's accounting system in step 122, are repeated every day or other first predetermined period until the end of the month or a second predetermined period has been reached. This is represented by step 124. If the end of the month or second predetermined period has not been reached, the process again reverts back to step 110. Thus, in a given month, each day a number of checks may be printed and sent to a patent or patent and trademark agency, information regarding which is sent to the financing organization's fee computer system, funds are deposited to cover the checks, and (first and second) invoices regarding which are generated.

While this activity is taking place, in step 126 the bank or other financial institution with which the financing organization is maintaining an account sends to the financing organization, either electronically or on paper, a statement (for example, a monthly or bi-weekly, or even daily statement), of all the activity that occurred in that account (i.e., an external source to the financing organization). The statement preferably includes second information regarding each transaction or check, including the check number, the date the check was presented for payment, the date of the check, and the amount of the check.

If the statement is transmitted electronically from the financial institution to the financing organization's fee computer system (for example, via modem communication, or over the Internet), then data regarding the second information is input directly into the financing organization's fee computer system. Otherwise, if the statement is delivered to the financing organization in paper format, data regarding the second information must be input manually into the financing organization's fee computer system. This may be by utilizing an optical character recognition (OCR) device, or having a data operator or similar personnel typing in the second information as data into the fee computer system on a computer keyboard.

In step 128, after the end of the month or other second predetermined period has been reached in step 124, the financing organization's computer system reconciles the first information regarding the checks uploaded by the workstation at the firm, with the second information inputted into the computer system. The computer system verifies that the dates, payees, and amounts of the checks as issued at the firm's workstation are consistent with the dates, payees, and amounts of the checks as received from the financial institution. If checks are issued at the workstation late in the month, second information regarding them may not have been received from the financial institution via the monthly statement, since typically a few days must pass before a given check clears at the institution. In such a situation, the fee computer system ignores the check, and flags it for reconciliation for next month.

If reconciliation is not achieved in step 130, then in step 132 the situation is examined manually, and errors are corrected as they are found. That is, the financing organization's computer system in step 130 will highlight to an account analyst or other personnel that a discrepancy has been detected. The analyst will then examine the records to determine, for example, if the law firm is issuing fraudulent checks, if the financial institution has committed an error, etc.

Once the first information regarding the checks for the month or other second predetermined period have been reconciled with the second information regard the checks, in step 134 a bill is generated by the financing organization's fee computer system and delivered to the law firm. The bill (i.e., a firm, or third, invoice) is for those checks that were cleared by the financial institution and included in the institution's statement in step 126 (that is, those checks that were not included in the statement in step 126, but were nevertheless issued in step 112, are held until the next month or other second predetermined period), plus a service charge for each check. As represented in step 136, the bill (third invoice) is preferably due in ninety days of receipt by the law firm. Optionally, the bill (or statement) includes the daily invoices that were previously generated, and does not require reconciliation as has been described.

The service charge for each check is preferably variable, depending on the amount of the check. For example, the service charge may be a particular percentage of amount of the check, such as eight percent, with a minimum service charge of twenty dollars. The service charge is charged by the financing organization for services rendered in conjunction with providing a loan to the firm's clients for the checks covering patent and trademark fees to patent agencies, and for the maintaining of deposit accounts and the software and apparatus required to operate the system. The service charge may be a flat fee, a flat fee plus a percentage of the amount paid to the patent agency on behalf of a client, a fee as looked up in the table (e.g., dependent on the amount paid to the patent agency), etc.; the invention is not so limited.

In step 138, the firm generates and sends to each client an invoice (fourth invoice) inclusive of the daily invoices (second or first) generated in step 132. This (fourth) invoice (i.e., a client invoice) may itself be included on a (fifth) invoice listing the other fees chargeable to the client, or may be a separate invoice to emphasize that the money being collected for the funds advanced on behalf of the client are those of the financing organization, and not the firm. The (fourth) invoice preferably lists for each check the date of the check, the payee patent or patent and trademark agency of the check, the amount of the check, the matter in conjunction with which the check was issued, as well as the service charge charged by the financing organization. The bill generated in step 138 typically also includes the fee schedule by which payment of the bill is governed, indicating what late charges, discounts, etc., will be provided in accordance with timely payment of the bill, or lack thereof. As represented in step 140, each client (fourth) invoice is preferably due in thirty days from receipt of the invoice, but is more typically paid sixty to ninety days from the date of the invoice.

Thus, for example, the firm in one embodiment of the invention sends to each client an invoice including all the charges and fees incurred for the client the previous billing period. These charges and fees typically include legal fees (such as attorney and paralegal fees), postage charges, photocopying charges, etc. In this embodiment of the invention, this monthly invoice also includes the charges extended on behalf of the client for the payment of patent and trademark fees, and has been described. In other words, the regular invoice the client receives includes all charges, including patent and trademark fees; the charges extended on behalf of the client are part of the regular invoice received by the client.

However, in an alternative embodiment, a special invoice may be generated and sent to a client for an unusually large patent or trademark fee (i.e., a "jumbo" fee). A firm may wish to have such a special invoice including a large fee so that it is sent to the client immediately, and there is no delay until the end of the regular billing period to send a regular invoice that might have normally included the charge. This is because the firm may desire to have the money for the fee paid sooner by the client, or may desire to accentuate to the client the enormity of the fee. The invention is not limited as to how charges included in special invoices are determined; in one embodiment, an operator at the firm (such as someone within the firm's accounting department) may manually identify such charges, while in another embodiment, all charges above a certain threshold are so earmarked for special invoicing.

Because each client (fourth) invoice is due preferably in thirty days, and the firm (third) invoice is due preferably in ninety days, typically the law firm will receive payment from its clients in step 142 to cover the firm (third) invoice before the firm invoice is due to the financing organization. Therefore, the firm will not have to use any of its own capital to cover the patent and trademark fees advanced by the financing organization for its clients. Insofar as the typical law firm's late-paying clients represent only a fraction of its total client base, such a law firm by utilizing the inventive computerized method will significantly reduce the amount of working capital allotted towards patent and trademark fees. Thus, in step 144, the firm sends payment as collected from its clients in step 142 to the financing organization in satisfaction of the (third) invoice sent to the law firm in step 134. The (third) invoice is received at the financing organization in step 146, ending the computerized method of FIG. 1(*a*) and FIG. 1(*b*).

Thus, there are three primary invoices or bills generated by the invention: the individual invoices for the individual checks generated at step 122 (either paper and/or electronic); the bill sent by the financing organization to the firm in step 134, and the bills sent by the firm to its clients in step 138. The bill sent by the financing organization to the firm in step 134 includes the information contained in the individual invoices generated at step 122; the individual invoices are generated for reconciliatory and record keeping purposes primarily. The bill in step 134 sent to the firm also includes the financing charges elicited by the financing organization. The firm sends its clients bills in step 138 to recoup the money loaned to the clients by the financing organization, as the financing organization has billed the firm in step 134.

Note, however, that the bills in step 138 sent by the firm to its clients do not necessarily have to correspond to the amounts listed in the bill sent from the financing organization to the client in step 134. For example, the firm may decide as a business decision to absorb some of the costs for a particular client, matter, or fee. In this case, the bill listed in step 134 will have a greater corresponding amount than that listed in a particular bill in step 138. The invention provides for this capability.

In other words, the invention provides for the capability of maintaining different discount or fee schedules for different clients of the firm. For example, the financing organization may charge a set service fee due at a given time, depending on the size of the amount advanced on behalf of an associated client of the firm. The firm, however, may decide that for certain clients it will underwrite or absorb a portion of this fee as a matter of course. Thus, the invention provides that the amount billed to a given client of the firm will reflect the discount accorded to the client, while the amount billed by the financing organization to the firm will still reflect the full amount. The invention therefore provides for different discount or fee schedules—including but not limited to the date when a fee is due, and the amount underwritten by the firm—for different clients.

A Second Preferred Computerized Method of the Invention

Figure 2A:
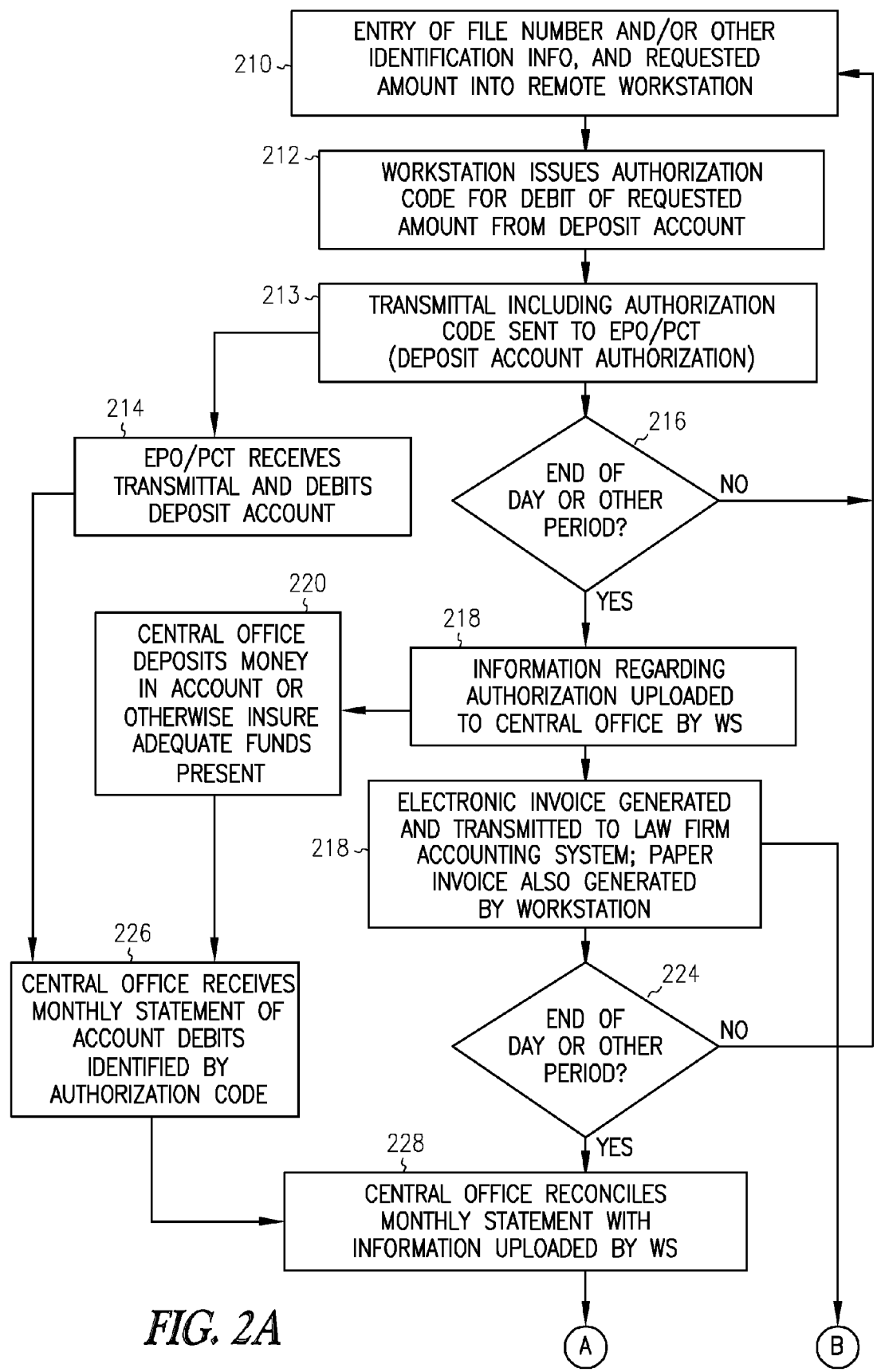
FIG. 2(a) and FIG. 2(b) show a flowchart of a second preferred computerized method of the invention.
Figure 2B:
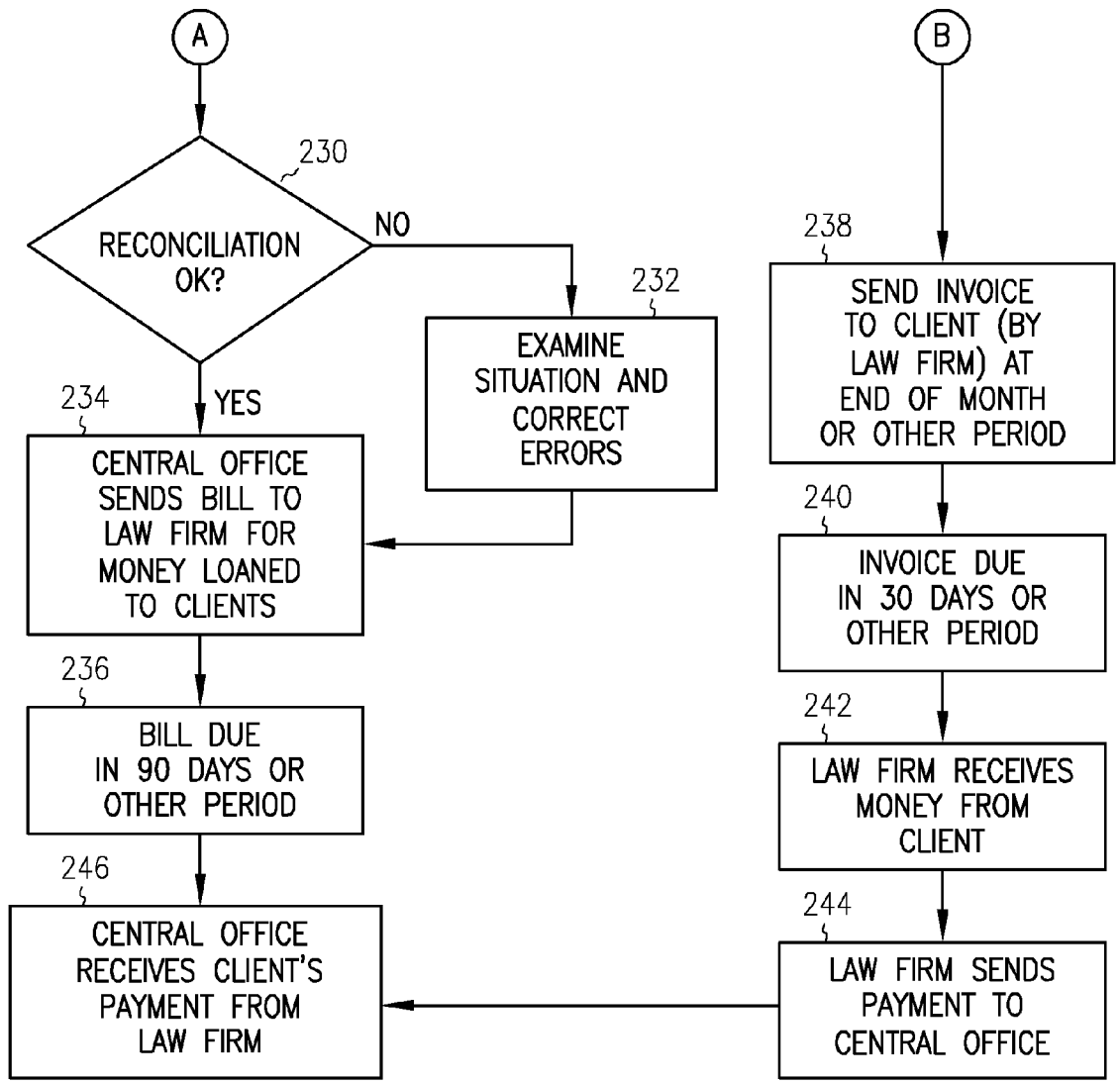

Referring next to FIG. 2(*a*) and FIG. 2(*b*), a second preferred computerized method of the invention is shown. In the second preferred computerized method, a law firm computer system issues an authorization for the debit of patent and trademark fees on behalf of its clients against a deposit or other account maintained with the patent or patent and trademark agency (such as the USPTO or EPO) by a separate financing organization. Like the computerized method of FIG. 1(*a*) and FIG. 1(*b*), the law firm does not advance its own funds on behalf of its clients. Unlike in FIG. 1(*a*) and FIG. 1(*b*), the payment is not made in the form of a check, but rather is in the form of a debit to a deposit account maintained by the separate financing organization with the patent or patent and trademark agency. Each step of the method of FIG. 2(*a*) and FIG. 2(*b*), except for step 213, corresponds to and is similar to a step of the method of FIG. 1(*a*) and FIG. 1(*b*) (step 210 corresponding to and similar to step 110, step 212 to step 112, et seq.).

Therefore, insofar as a step in the method of FIG. 2(*a*) and FIG. 2(*b*) performs a function as does its corresponding step in the method of FIG. 1(*a*) and FIG. 1(*b*), reference should be made to the discussion of the corresponding step for further understanding thereof. For example, insofar as alternative and optional embodiments and/or additional functionality are described in reference to one or more steps of FIG. 1(*a*) and FIG. 1(*b*) that are applicable to counterpart step or steps of FIG. 2(*a*) and FIG. 2(*b*), such embodiments and functionality are also applicable to the method of FIG. 2(*a*) and FIG. 2(*b*). Those of ordinary skill within the art will readily appreciate that the alternative and optional embodiments and/or additional functionality described in reference to the method of FIG. 1(*a*) and FIG. 1(*b*) are also applicable to the method of FIG. 2(*a*) and FIG. 2(*b*), and that the scope of the invention encompasses such alternative and optional embodiments and/or additional functionality in relation to FIG. 2(*a*) and FIG. 2(*b*) as well.

Furthermore, insofar as alternative and optional embodiments and/or additional functionality are described in reference to one or more steps of FIG. 2(*a*) and FIG. 2(*b*) that are applicable to counterpart step or steps of FIG. 1(*a*) and FIG. 1(*b*), such embodiments and functionality are also applicable to the method of FIG. 1(*a*) and FIG. 1(*b*). Those of ordinary skill within the art will readily appreciate that the alternative and optional embodiments and/or additional functionality described in reference to the method of FIG. 2(*a*) and FIG. 2(*b*) are also applicable to the method of FIG. 1(*a*) and FIG. 1(*b*), and that the scope of the invention encompasses such alternative and optional embodiments and/or additional functionality in relation to FIG. 1(*a*) and FIG. 1(*b*) as well.

In step 210, identification information regarding a particular patent or trademark fee is entered into a workstation at the law firm. This information includes the amount of the fee, the payee patent or patent and trademark agency of the fee, and the client and matter number or other code for which the fee is being requested. Other information may also be included.

In step 212, an authorization for the debit of the fee from a deposit account maintained by the separate financing organization with the patent or patent and trademark agency is issued at the workstation. For example, the Patent Cooperation Treaty Office (PCTO) of a subscribing nation permits the establishment of a deposit account, similar to a bank account, to which funds can be deposited, and against which payment for fees can be made. The deposit account is thus provided as a convenience by the PCTO of a subscribing nation. The authorization authorizes a law firm to debit funds from a deposit account.

In step 213, the filing associated with the authorization for debit is mailed to the payee patent or patent and trademark agency. Preferably but optionally, for each authorization generated, the work station includes an authorization code, which may be unique. The authorization code is preferably placed on correspondence to the patent agency in a manner such that it is reported back to the account holder in a deposit account report, so that traceability of the authorization is provided for. For example, the transmittal form may include instructions to the deposit account operator to enter the code plus a file number into the patent agency's system. Thus, this code may be included with the transmittal requesting a debit from the deposit account.

As another example, the authorization code may be placed in text near the deposit account authorization on the transmittal form, with instructions to have this entered into the patent agency's system by the operator in lieu of the file number. This authorization code then acts as a serial number, to keep track of each serial number issued against the deposit account (kept track of from the perspective of the firm, the patent agency, and the financing organization). The serial numbers may be automatically generated when printing the transmittal, or obtained from a counter computer program as known within the art. In addition, this serial code may be a bar code.

In an alternative embodiment of the invention, the authorization code is obtained from a separate authorization terminal which can dial into the financing organization's computer system. This separate authorization terminal may be similar to that found in retail establishments for the approval of credit card transactions. In another alternative embodiment of the invention, calls can be received at the financing organization to obtain authorization code via voice, such that the calls are answered by a live operator, or handled by an automatic voice response system. Such calls may originate from either within or without of the firm.

These alternative embodiments are additional manners by which the financing organization compiles the list of transmittals submitted and fees requested or estimated at the firm, and by which the financing organization may keep track of the type of transaction in conjunction with which the transmittals are submitted (e.g., via categories entered at the time of authorization, such as new application, issue fee, amendment, etc.). Thus, the alternative embodiments permit the financing organization's system to automatically tabulate wire transfers (or other transfers of funds to cover the charges) based on authorization codes. In addition, the utilization of type of transaction data can be used to estimate probable error rates for deposit account authorizations (e.g., issue fees are typically not often wrong, while filing fees are more prone to error, etc.). Thus, this data can be used to keep track of statistics of average errors on deposit account authorizations, to suggest an appropriate safety balance that should be kept in the deposit account to prevent overdrafting of the account.

In still another alternative embodiment, overdrafts may be handled by using a back-up as a ready reserve to cover the overdrafts. The firm may itself keep a deposit account to use as such a back-up account. Alternatively, the financing organization may maintain the deposit account.

In step 214, the payee patent or patent and trademark agency receives the filing. The payee patent or patent and trademark agency debits the deposit accounted maintained by the separate financing organization with the patent or patent and trademark agency for the amount of the fee. Preferably, the agency notes the authorization code for the transaction in its records. The process of the entry of a authorization request in step 210 and an authorization being issued in step 212 and mailed in step 213 (for ultimate receipt and debit by the patent or patent and trademark agency in step 214) is repeated as needed within a first predetermined period, such as a day. This is represented by step 216. If the end of the day or other first predetermined period has not been reached, the process reverts back to step 210. Thus, in a given day, a number of authorizations may be requested, issued, and mailed.

Once the end of the day or other first predetermined period is reached, the process continues to step 218. In step 218, first information regarding the authorizations issued during that day or other first predetermined period are electronically transmitted to the financing organization's fee computer system. The first information preferably includes for each authorization, the code itself, the date on which the code was authorized, the amount of debit for which the code was authorized, and the patent or patent and trademark agency payee. Other information may also be included (such as the serial number, as has been described). This generated first information may thus be used to keep track of information, and serve as a back-up to the financing organization's maintenance of the same information. Moreover, the firm may use this information to verify transfers to the account each day, etc. Furthermore, this permits the invoice to automatically generate invoices, other alternatively the financing organization may communicate with the firm and verify fund transfers prior to the firm uploading electronic invoices (as described later in this section of the detailed description).

In step 220, the separate financing organization deposits, preferably via wire transfer, enough money into its deposit account to cover the amounts of the debits for which authorizations were issued during that day or other first predetermined period. Assuming a daily period, this provides sufficient time for the financing organization to deposit funds to cover the debits. For example, if on day one the law firm issues ten debits totaling $5,000 in repeated steps 210 and 212, first information regarding the debits will be uploaded to the financing organization's fee computer system in step 218 at the end of day one, and the financing organization will be able to deposit sufficient funds to cover the debits no later than the beginning of day two. Even if the filings including the transmittals containing the authorizations for the debits are mailed via next-day mail to the patent or patent and trademark agency in step 213, the patent or patent and trademark agency will be able to debit the deposit account no earlier than day two—the same day on which the funds covering the debits were deposited by the financing organization in step 220.

In step 222, the workstation at the law firm generates, also at the end of each day or other first predetermined period, for each charge an electronic fee (first) invoice and transmits it to the firm's accounting system. A paper (second) invoice for verification purposes is also generated. Each electronic (first) invoice preferably includes the date of the issuance of the authorization and code, the payee patent or patent and trademark agency, the amount of the authorized debit, and the client and matter associated with the check. While these second invoices, while described as being daily, may in fact be generated at the end of each day, as has been described, or at the same time as each charge is issued.

The uploading of first information regarding the debits authorized during that day or other first predetermined period in step 218, the depositing of funds by the financing organization to cover the debits authorized for that day or other predetermined in step 220, and the generation of an electronic invoice (first invoice) and paper invoice (second invoice) and transmission to the firm's accounting system for that day or other first predetermined period in step 222, are repeated every day or other first predetermined period until the end of the month or a second predetermined period has been reached. This is represented by step 226. If the end of the month or second predetermined period has not been reached, the process again reverts back to step 210. Thus, in a given month, each day a number of debits may be authorized, information regarding which is sent to the financing organization's fee computer systems, funds are deposited to cover the debits, and (first and second) invoices regarding which are generated.

While this activity is taking place, in step 226 the patent or patent and trademark agency sends to the financing organization, either electronically or on paper, a statement of all the activity that occurred in the deposit account (i.e., an external source to the financing organization). The statement preferably includes second information regarding each transaction (for example, each debit or deposit), including the authorization of each debit, the date of each transaction, and the amount of the transaction. This second information is inputted into the financing organization's fee computer system.

In step 228, after the end of the month or other second predetermined period has been reached in steep 224, the financing organization's computer system reconciles the first information regarding the debits uploaded by the workstation at the firm, with the second information inputted into the computer system. Preferably reconciliation is performed by matching authorization codes from the financing organization's computers with the agency's records. The computer system verifies that the dates, authorizations, and amounts of the debits as issued at the firm's workstation are consistent with the second information as received from the patent or patent and trademark agency.

If debits are issued at the workstation late in the month, second information regarding them may not have been received from the patent or patent and trademark agency via the monthly statement, in which case the fee computer system ignores the debit, and flags it for reconciliation for the next month. That is, balancing (reconciliation) is only performed for those charges actually debited by the patent and trademark agency during a particular billing period. For example, a debit may be issued on July 30, but not actually be redeemed by the agency until August 2. In this case, the organization will receive a statement from the agency that does not reference this debit, assuming that statements are issued each calendar month. The organization will therefore hold the debit on its books for reconciliation in the following billing period.

If reconciliation is achieved in step 230, then in step 232 the situation is examined manually by financing organization personnel, and errors are corrected as they are found. Once the first information regarding the debits have been reconciled with the second information regarding the debits, in step 234 a bill is generated by the financing organization's fee computer system and delivered to the law firm. The bill (i.e., a firm or third invoice) is for those debits that were included in the patent or patent and trademark agency's statement in step 226, plus a service charge for each debit. As represented in step 236, the bill (third invoice) is preferably due in ninety days of receipt by the law firm.

In step 238, the firm generates and sends to each client a (fourth) invoice inclusive of the daily invoices generated in step 232. This (fourth) invoice (i.e., a client invoice) may itself by included on a (fifth) invoice listing the other fees chargeable to the client (for example, attorney's fees), or may be a separate invoice. The (fourth) invoice preferably lists for each debit the date of the debit, the authorization of the debit, the payee patent or patent and trademark agency (that is, the patent or patent and trademark agency maintaining the deposit account, the amount of the debit, the matter in conjunction with which the debit was issued, as well as the service charge. As represented in step 240, each client (fourth) invoice is preferably due in thirty days from receipt of the invoice.

Because each client invoice is due preferably in thirty days, and the firm (third) invoice is due preferably in ninety days, typically the law firm will receive payment from its clients in step 242 to cover the firm (third) invoice before the firm invoice is due to the financing organization. Therefore, the firm will not have to use any of its own capital to cover the patent and trademark fees advanced by the financing organization for its clients. Thus, in step 244, the firm sends payment as collected from its clients in step 242 to the financing organization in satisfaction of the (third) invoice sent to the firm in step 234. The (third) invoice is received at the financing organization in step 246, ending the computerized method of FIG. 2(*a*) and FIG. 2(*b*).

Figure 3A:
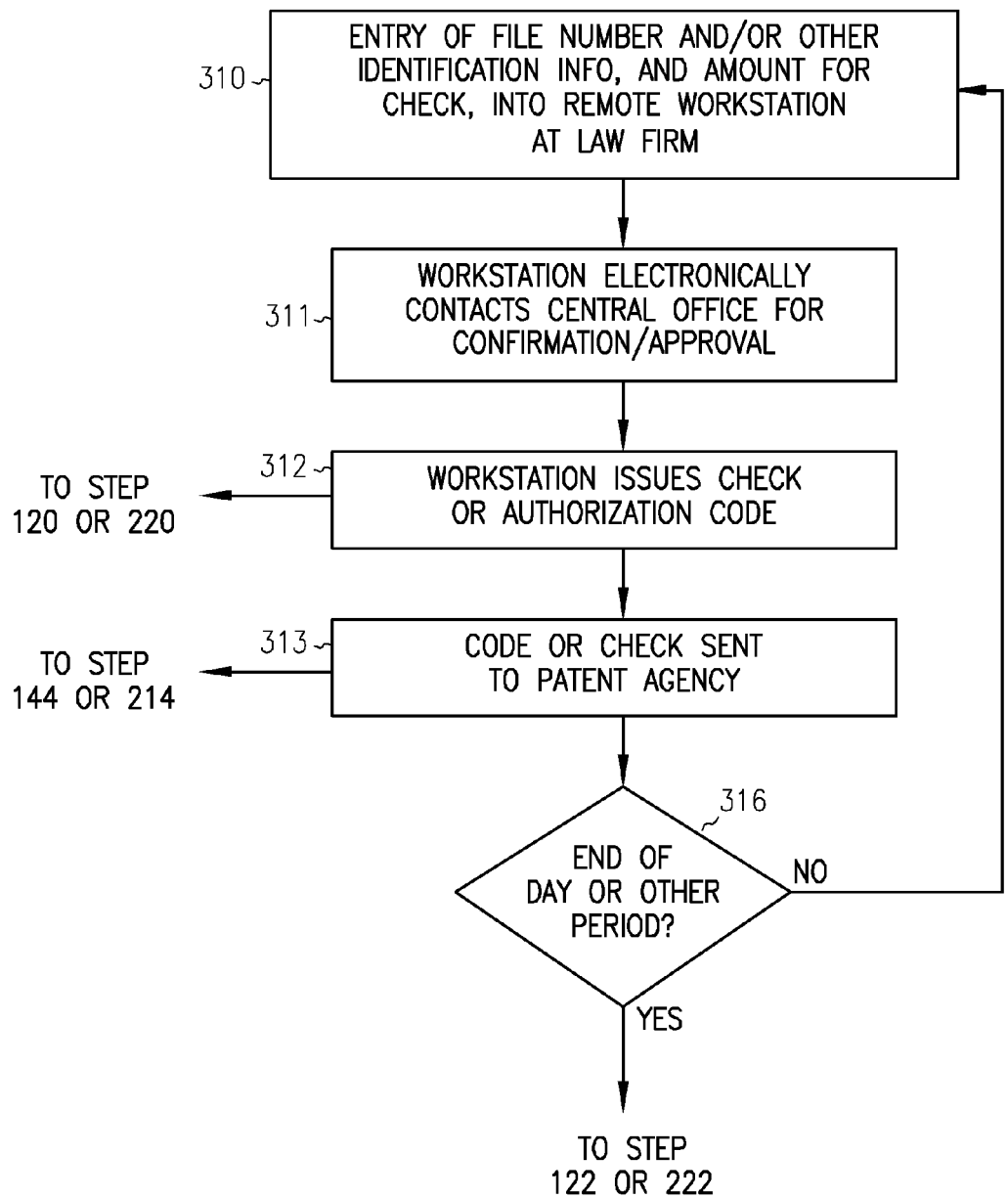
FIG. 3(a) shows a flowchart of an alternative embodiment of the first and the second preferred methods of the invention.
Figure 3B:
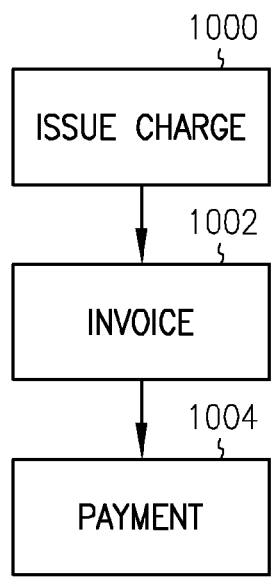
FIG. 3(b) shows a flowchart of a recirculating retainer embodiment of the invention.
Figure 3C:
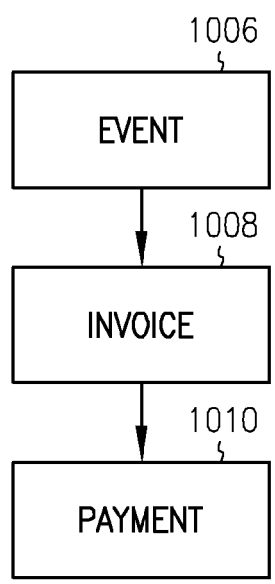
FIG. 3(c) shows a flowchart of a pre-billing arrangement embodiment of the invention.

An Alternative Embodiment of the First and the Second Preferred Methods of the Invention Referring to FIG. 3(*a*), an alternative embodiment of the first and the second preferred methods of the invention is shown. In this alternative embodiment, the law firm computer system contacts the financing organization's computer system before issuing each charge (i.e., before printing a check, or before issuing an authorization), so that the financing organization's computer system may approve the charge before it is issued. The alternative embodiment of FIG. 3(*a*) replaces steps 110, 112 and 116 of the method of FIG. 1(*a*) and FIG. 1(*b*), and replaces steps 210, 212, 213 and 216 of the method of FIG. 2(*a*) and FIG. 2(*b*). Specifically, steps 310, 312 and 316 replace steps 110, 112 and 116, respectively, and steps 310, 312, 313 and 316 replace steps 210, 212, 213 and 216, respectively.

In step 310, information regarding a particular patent or trademark fee is entered into a workstation at the law firm. The information entered into the workstation regarding the particular fee preferably includes the amount of the fee, the payee patent or patent and trademark agency of the fee, and client and matter number or other code for which the fee is being requested. Other information may also be included.

In step 311, the workstation electronically contacts the financing organization's fee computer system to receive approval for the requested fee. This may be accomplished by a modem at the workstation communicating with a modem at the fee computer system, or over the Internet, assuming that both the workstation and the fee computer system are so connected to the Internet. The invention is not limited to the manner by which electronic communication is effectuated. In step 311, the workstation also sends first information regarding the requested fee. This first information includes the date of the fee request, the amount of the fee request, the payee of the fee, and the authorization (in the case where the method of FIG. 3(*a*) is an alternative embodiment to the method of FIG. 2(*a*) and FIG. 2(*b*)) or check number of the check (in the case where the method of FIG. 3(*a*) is an alternative embodiment to the method of FIG. 1(*a*) and FIG. 1(*b*)) to be issued once approval is received from the financing organization's fee computer system.

Once approval has been received in step 311, in step 312 the workstation issues a check for the requested fee in the case where the method of FIG. 3(*a*) is an alternative embodiment to the method of FIG. 1(*a*) and FIG. 1(*b*), or issues an authorization for the requested fee in the case where the method of FIG. 3(*a*) is an alternative embodiment to the method of FIG. 2(*a*) and FIG. 2(*b*). The check is printed on a printer coupled to the workstation and is payable against an account maintained by the financing organization with a financial institution such as bank. The authorization for debit of the fee from a deposit account maintained by the financing organization with the patent or patent and trademark agency.

The step of having the workstation receive electronic approval for every fee ensures that the fee computer system of the financing organization receives information regarding the debits or checks issued by the workstation as they are issued, instead of only at the end of the day (for example, in step 118 of FIG. 1(*a*) and FIG. 1(*b*), or step 218 of FIG. 2(*a*) and FIG. 2(*b*)). This allows the fee computer system to keep more timely track of the debits and checks issued at the workstation. This is advantageous because the financing organization is able to more closely monitor the firm to ensure that no fraud is occurring, and it is able to more timely learn the amount of the deposit that will be required in the account to cover the debits or checks.

From step 312, the alternative embodiment of FIG. 3(*a*) proceeds to step 120 of FIG. 1(*a*) and FIG. 1(*b*) or step 220 of FIG. 2(*a*) and FIG. 2(*b*), in which step the financing organization deposits sufficient funds to cover the debits or checks issued at the workstation. The deposit may be made as debits or checks are requested at the workstation, or may be made on at the end of each day or other first predetermined period. Also from step 312, the alternative embodiment of FIG. 3(*a*) proceeds to step 313. In step 313, the filing, including a transmittal with the authorization for the debit of the requested fee or the check for the requested fee, is sent to the patent or patent and trademark agency. From step 313, the alternative embodiment of FIG. 3(*a*) proceeds to step 114 of FIG. 1(*a*) and FIG. 1(*b*) or step 214 of FIG. 2(*a*) and FIG. 2(*b*), in which step the patent or patent and trademark agency receives the filing and cashes the check against the account maintained by the financing organization with a financial institution or debits the deposit account maintained by the financing organization.

The process of the entry of a fee request in step 310, the workstation electronically contacting the fee computer system in step 311, the workstation issuing the check or authorization in step 312, and the filing including the check or a transmittal with the authorization being mailed to the patent or patent and trademark agency in step 313 is repeated as necessary within a first predetermined period, such as a day. This is represented in step 316. If the end of the day or other first predetermined period has not been reached, the process reverts back to step 310. Thus, in a given day, a number of fees may be requested, approved, issued, and mailed. Once the end of the day or other first predetermined period is reached, the process continues to step 122 of FIG. 1(*a*) and FIG. 1(*b*) or step 222 of FIG. 2(*a*) and FIG. 2(*b*), in which step an invoice is generated. The alternative embodiment of FIG. 3(*a*) ends by continuing with the methods as shown in and described in conjunction with FIG. 1(*a*) and FIG. 1(*b*) or FIG. 2(*a*) and FIG. 2(*b*).

Recirculating Retainer Feature

In this section of the detailed description, a recirculating retainer feature of at least one embodiment of the invention is described. The feature is amenable for inclusion with other embodiments of the invention described elsewhere in this application, as those of ordinary skill within the art can appreciate. However, the invention is not so limited.

Referring to FIG. 3(*b*), in 1000, a charge is issued for a requested fee, associated with a matter of a client of a law firm, for payment to an agency such as the U.S. Patent and Trademark Office. The charge is payable against an account maintained by an organization separate from the firm, and the account itself is for the client. The account is initially funded by the client with a retainer or other payment, so that the account has an initial positive balance against which the charge can be paid.

Thereafter, in 1002, a client invoice is generated that includes the charge for the requested fee. This invoice is sent to the client. The client, in 1004, sends payment for the charge—even though the charge has been paid already out of funds already sent by the client—so that the account can be replenished. In this way, the account retains a positive balance, against which other charges can then be made. This continual replenishment of the retainer in the account as charges are made against the retainer is referred to as a recirculating retainer.

Pre-Billing Arrangement

In this section of the detailed description, a pre-billing arrangement feature of at least one embodiment of the invention is described. The feature is amenable for inclusion with other embodiments of the invention described elsewhere in this application, as those of ordinary skill within the art can appreciate. However, the invention is not so limited.

Referring to FIG. 3(*c*), in 1006, an event occurs, notice of which is received by one of the computer systems of an embodiment of the invention (e.g., the accounting computer system, or the fee computer system, etc.). The event is for a matter of a client of a firm that will require a fee associated with the matter to be paid to an agency such as the USPTO by a due date. For example, the USPTO may have sent an issue fee notice, which requires payment of the issue fee for timely issuance of a patent. In one embodiment, 1006 is accomplished by first, notice of the event being received at an accounting computer system of the firm, and, second, data regarding the event being transmitted from the accounting computer system to a fee computer system of the organization.

In 1008, a client invoice is generated that includes the charge for the requested fee. The client invoice can be generated by any computer system in one embodiment of the invention (e.g., the accounting computer system of the firm, or the fee computer system of the organization). More specifically, in one embodiment, generating the invoice comprises first generating the charge for the requested fee at the fee computer system of the organization. Next, data regarding the charge is transmitted from the fee computer system to an accounting computer system of the firm. Finally, the second client invoice is generated at the accounting computer system.

Thus, in 1010, once the client pays the charge, the account maintained by the organization separate from the firm for the client, is pre-funded—such that when the charge is actually made to the agency (e.g., the USPTO), there are funds to cover the charge already in the account. In other words, upon payment by the client prior to the due date, the account will have a sufficient positive balance to cover the requested fee.

The client invoice in one embodiment can be less than the requested fee, if the account already has a positive balance (but less than the requested fee), to cover the difference of what the fee is and what the account balance is. For example, the account balance may be $75, while the requested fee may be $100. In this case, a client invoice can go out for at least $25, so that the account balance is at least $100 after payment so that the requested fee can be fully covered.

Interest, Refunds, and Credit Cards

In this section of the detailed description, interest, refunds, and credit card features of at least one embodiment of the invention is described. These features are amenable for inclusion with other embodiments of the invention described elsewhere in this application, as those of ordinary skill within the art can appreciate. However, the invention is not so limited. Furthermore, these features can be incorporated by themselves individually or together with other embodiments of the invention.

In one embodiment, the interest feature is accomplished as follows. Interest is computed on any positive balance of the account, to be paid to the client. Furthermore, it is determined whether on average (30, 60, etc., days) the account has had a positive balance, and if so, charges for requested fees for transmittal to an agency such as the USPTO are provided at no cost to the client (either in addition to or in lieu of paying interest to the client).

Thus, interest can be paid to a client on an average daily basis. Furthermore, as long as an account stays positive on average, there may be no fee assessed to the client for the organization's services of paying requested fees to the agency; if the account goes below zero on average, then the organization can charge as has been described elsewhere in this application.

In one embodiment, the refund feature is performed as is now described. A refund is issued to the client for regular payment made thereby, for charges to be made for requested fees associated with a matter for payment to an agency. That is, when the client on a regular basis pre-pays charges for payment to an agency, a refund can be issued.

In other words, once it is known that clients are paying charges back regularly, a refund for prompt payment can be issued. For example, once a week the fee computer system can determine whether a client has paid a cost in advance of when the firm has to repay the organization. The firm can in turn pay the organization early, and get a discount. The fee computer system then generates a list of clients that are entitled to receive discounts. The client, therefore, is rewarded for payment in advance of the pay cycle. The rebates can be generated and mailed by the organization, or applied to the next service charge applied to the customer's matters.

In one embodiment, the credit card feature is performed as is now described. Payment can be made by a client by charging a credit card or a charge card of the client—this charging in one embodiment is automatic, such that the client does not have to preauthorize every charge. The credit or charge card can be a Visa card, a MasterCard card, an American Express card, an Optima card, a Discover card, etc., the invention is not so limited. Furthermore, the credit or charge card in one embodiment is sponsored or issued by the organization—for example, for charges only made by the organization. Thus, clients can each be issued their own credit or charge card by the organization.

Tracking

In this section of the detailed description, a tracking feature of at least some embodiments of the invention is described. The feature is amenable for inclusion with other embodiments of the invention described elsewhere in this application, as those of ordinary skill within the art can appreciate. However, the invention is not so limited.

In one embodiment, this is performed as is now described. A payment made by the client is tracked, as covering either an already made charge for a requested fee associated with a matter for payment to an agency such as the USPTO, or a charge to be made for the requested fee. That is, the payment tracks whether it is to replenish the account of the client for a charge already made, or it has been paid in advanced of a charge to be made (i.e., in the case of a pre-billing arrangement). Thus, invoices are generated for both already made charges and charges to be made, and made by the client are tracked as covering one or the other type of charges.

In one embodiment, this is accomplished by inserting a unique serial number into each firm invoice uploaded by the fee computer system into the firm's accounting computer system, although the invention is not so limited. These invoices are itemized charges in the disbursement portion of the law firm bill. Once each period (a week, every day, etc.), the law firm accounting system outputs a file that includes a copy of all the itemized charges that correspond to paid invoices. This file is searched by the fee computer system, which matches paid itemized charges to the source fee computer system records for those charges. Once matched, the fee computer system is able to determine which clients have replenished how much of their retainer, or simply which clients have paid back their charges that have already been made to an agency such as the USPTO by the organization.

In another embodiment, tracking is performed as follows. Referring to FIG. 3(*d*), in 1012, invoices are generated. First, these invoices include charges that have been already made for requested fees for transmittal to an agency for clients of the firm, where the charges are payable against accounts (each account corresponding to a client). They also include charges that have not yet been made, in accordance, for example, with a pre-billing arrangement. A unique tracking number for each charge issued by the organization to the agency for a client can be assigned in 1012, such that the invoice includes the unique tracking number.

In 1014, the payments made by the clients as covering already made charges or charges to be made are tracked. This can include matching payments made by the client with the unique tracking numbers generated in 1012, to determine whether a given charge was prepaid by the client or not.

Alternative embodiments are also contemplated. For example, a combination of file number, date and charge amount could be examined, so that unique serial numbers are not necessary. Also, the account computer system could output just the serial numbers of items associated with paid invoices, so that there is no need to search an itemized entry for the serial number.

Payables Management

In this section of the detailed description, a payables management feature of at least some embodiments of the invention is described. The feature is amenable for inclusion with other embodiments of the invention described elsewhere in this application, as those of ordinary skill within the art can appreciate. However, the invention is not so limited.

As has been described, embodiments of the invention can be utilized to pay for the fees that are to be submitted to agencies such as the USPTO. However, as described herein, the invention is not so limited. Other embodiments of the invention can be used to pay for what are generally referred to as "payables" for submission to what are generally referred to as "vendors." A payable, for example, can be a fee, payable to a vendor, such as an agency. Thus, those of ordinary skill within the art can appreciate that the invention is amenable to management of payment of payables other than fees, to vendors other than agencies.

For example, an embodiment of the invention can be set up such that a firm enters a request to pay a vendor in 10, 30, 60 days, etc. This request generates an invoice at the firm accounting system, with the organization's service fee (charge) included, and this information is uploaded to the fee computing system. The fee computer system remembers that the firm needs a check for the desired amount at the designated future date. On this date, the firm prints a desired check as has been described, which has already been billed to the client. The client then repays the organization some time after the check is written—for example, 30, 60, 90 days, etc. The organization charges a service fee to carry the charge. The service fee, or a portion thereof, is included in the amount invoiced to the client.

As another example, an embodiment of the invention can be used where the organization itself cuts checks for the payables and mails them to the firm, to save on firm labor. A "paid" file can be generated and uploaded into the accounting computer system once a bill is paid. In addition, in another embodiment, a bill is paid by wire transfer, so that no check needs to be issued.

The payable system described can also be used for foreign payables, where requests are made in foreign currency. A payable request for a foreign currency is made, and a rate is quoted for how much that check or wire transfer will cost at the time the bill is set to be paid, plus an added service charge. The fee computer system could receive the request for foreign payables, submit the request for a quote from a foreign currency company, add the service charge, and download the information to the accounting computing system, so that the firm is able to invoice the client. Foreign annuity payments are also amenable for this embodiment of the invention.

With respect to foreign payables (such as fees for foreign patent offices), in one embodiment, these are able to be made at the firm. For example, a client of the firm requires that a payment be made to the Japanese Patent Office in yen. This embodiment provides for the cutting of a check in yen on-site at the firm. Besides a check, in one embodiment of the invention the payable is paid by a wire transfer. In addition, the account can vary as to the type of currency that is requested. For example, in one embodiment, a check or wire transfer in yen is against one account (either specific to a client, or for all clients), while a check or wire transfer in euros is against a different account (again, either specific to a client, or for all clients).

Exemplary System Architecture of the Present Invention

Figure 4:
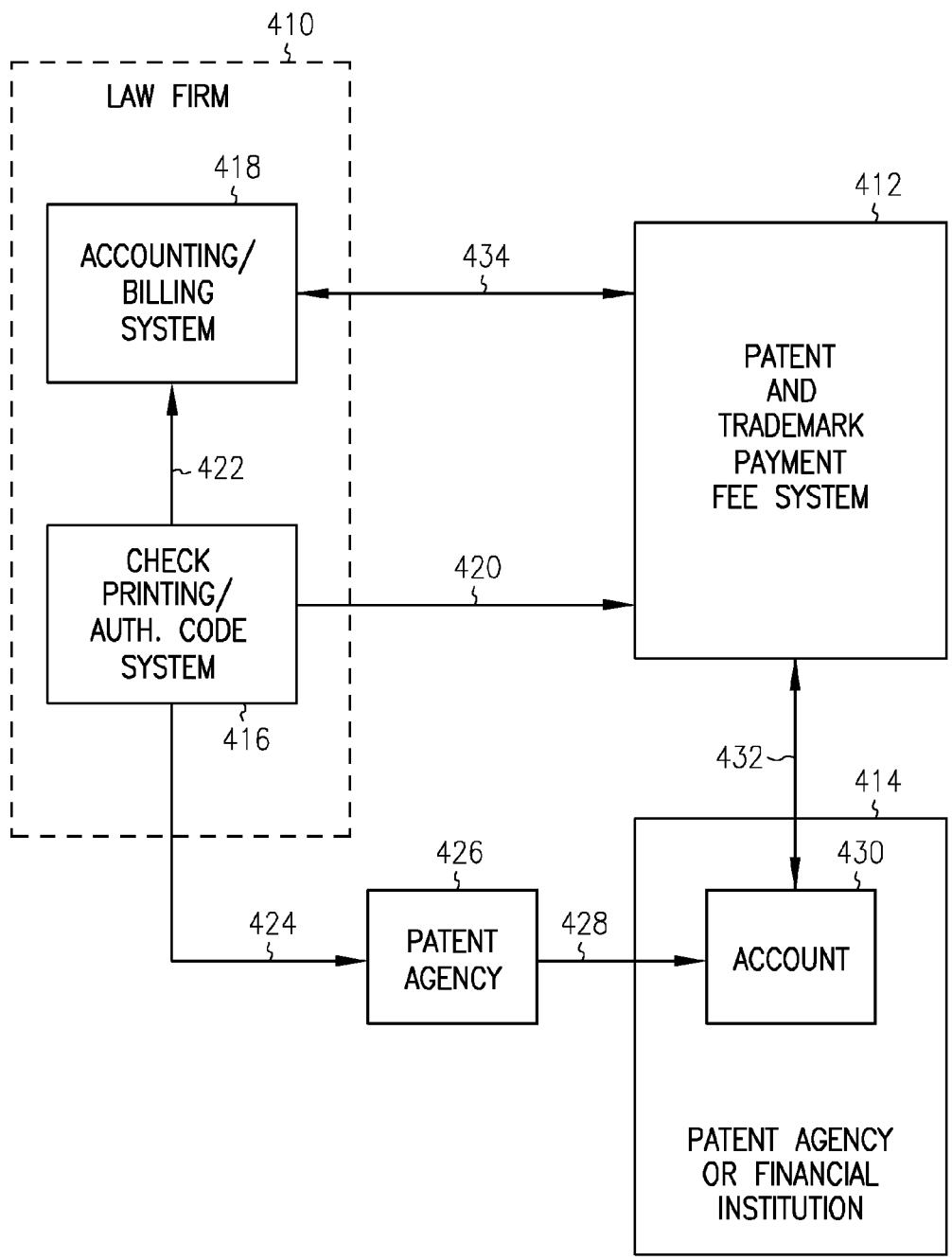
FIG. 4 shows a diagram of an exemplary system architecture in which the preferred methods of the invention may be practiced.

Referring to FIG. 4, a diagram of an exemplary system architecture in which the preferred methods of the invention may be practiced is shown. The exemplary system architecture includes three computer systems: a firm computer system 410 maintained by a firm such as a law firm, such as a networked computer system, a fee computer system 412 maintained by a financing organization separate from the firm (i.e., a first organization), and an account computer system 414 maintained by either a patent or patent and trademark agency or a financial institution (i.e., a second organization). The systems 410, 412 and 414 are preferably physically separate from one another, and communicate with one another electronically as is described.

The firm computer system 410 includes first computer subsystem 416 and second computer subsystem 418. First computer subsystem 416 includes the workstation described in conjunction with the preferred embodiments of the invention of FIG. 1(a), FIG. 1(b), FIG. 2(a), and FIG. 2(b), at which the requested trademark or patent fee is input and stored, and at which the charge for the requested fee (a check or an authorization and code for a debit) is issued. Second computer subsystem 418 includes the firm's accounting system as described in conjunction with the preferred embodiments of the invention of FIG. 1(a), FIG. 1(b), FIG. 2(a), and FIG. 2(b).

Thus, computer system 410 includes preferably a check printer and software in accordance with the methods of the invention as have been described. The software preferably allows entry of a file number for the check or charge to be issued. After the check has been printed, the software is updated to reflect that the check has been issued. In an alternative embodiment, the file number is also printed on the check. Checks may be preprinted to the Patent and Trademark Office (PTO) of the United States, the European Patent Office (EPO), or a PCT office (either U.S. or European); the invention is not so limited. The software may also be allowed to only print checks with PTO, EPO or a PCT office as the payee of the check. The check printer preferably "signs" the checks with a special magnetic ink. The software also preferably prevents the law firm from overdrawing a preset credit limit authorization.

As represented by arrow 420, first computer subsystem 416 communicates electronically with fee computer system 412. Computer subsystem 416 communicates with fee computer system 412 to provide the first information regarding a charge for a requested fee entered at computer subsystem 416, such as the date of the charge, the amount of the charge, the payee patent or patent and trademark agency of the charge, etc., on a daily basis or at the end of another first predetermined period. Computer subsystem 416 also communicates with fee computer system 412 in the alternative embodiment to request approval for a charge before the charge is issued.

Fee computer system 412 preferably has software to download data from firm computer system 410 at the law firm and generate an invoice requiring from the firm a payment in a predetermined period. Preferably, fee computer system 412 also generates reports showing checks and charges issued, as sorted by client. In an alternative embodiment, the software provides output to disk that can be uploaded to a law firm accounting system (such as second computer subsystem 418 of firm computer system 410), or electronically uploads the invoices directly into computer subsystem 418. Fee computer system 412 also preferably has software to upload daily account data to firm computer system 410 to indicate to system 410 how much credit is available to the firm.

The software of fee computer system 412 also preferably keeps track of deposit accounts or other accounts, and can receive from firm computer system 410 preferably via an electronic upload data showing what the firm authorized for deposit the previous day. The software preferably generates a report showing what needs to be transferred into the deposit account, or electronically links to a financial institution requesting a wire transfer of sufficient funds. The software also preferably includes records of daily balances in its account as received from a patent agency such as the United States Patent and Trademark Office, and reconciles this balance with its own expected balance. The software is preferably able to track multiple deposit accounts with a given patent agency or numerous patent agency. When uploading data to second computer subsystem 418 of firm computer system 410, fee computer system 412 first reformats the data to ensure that it is compatible with subsystem 418. The software of fee computer system 412 tracks credit limits, collection of invoices, and maintains balances, as has been described.

As represented by arrow 422, first computer subsystem 416 also communicates electronically with second computer subsystem 418, to provide second computer subsystem 418 with an electronic fee invoice of the charges issued by the first computer subsystem 416. Preferably, the transmission of electronic invoices from first computer subsystem 416 to second computer subsystem 418 is accomplished on a daily basis, but may also be accomplished at the end of an alternative first predetermined period as well.

Arrow 424 represents the delivery of the charge from first computer subsystem 416 to patent or patent and trademark agency 426. Patent or patent and trademark agency 426 is an agency such as the USPTO, EPO, PCTO, etc. The delivery of the charge is typically performed via next-day mail. The patent or patent and trademark agency thus receives the charge as either a transmittal including an authorization and optionally a debit for debit from a deposit account maintained by the financing organization maintaining fee computer system 412 with patent or patent and trademark agency 426, or as a check payable against an account maintained by the financing organization maintaining fee computer system 412 with a financial institution such as a bank.

Arrow 428 represents the debit for the fee or the cashing of the check for the fee by patent or patent and trademark agency 426 from account 430, as electronically maintained within account computer system 414 (i.e., data stored within system 414 representing account 430). In the case where arrow 428 represents the debit for the requested patent or trademark fee, account 430 is a deposit account maintained by the financing organization maintaining fee computer system 412, and account computer system 414 is itself ultimately maintained by patent or patent and trademark agency 426. In the case where arrow 428 represents the cashing of the check for the requested patent or trademark fee, account 430 is an account maintained by the financing organization maintaining fee computer system 412 with a financial institution, and account computer system 414 is maintained by the financial institution.

Arrow 432 represents the flow of information and funds between the financing organization as represented by the financing organization's fee computer system 412, and the financial institution or patent or patent and trademark agency 426 as represented by the account computer system 414. As first computer subsystem 416 provides fee computer system 412 first information regarding the charge issued at first computer subsystem 416 (represented by arrow 420), the financing organization transfer funds to account 430 maintained by account computer system 414 to cover the charges. Thus, arrow 432 first represents the flow of money from the financing organization to patent or patent and trademark agency 426 or the financial institution maintaining account computer system 414. Preferably, the transfer of funds is initiated by fee computer system 412 such that no human involvement is necessary. The transfer of funds may be accomplished by a wire transfer, or other manner; the invention is not so limited. As described in conjunction with the preferred methods of the invention, the depositing of funds is preferably accomplished on a daily basis, but may also be accomplished at the end of a different first predetermined period as well, or as each charge is requested.

Furthermore, at the end of every month or other second predetermined period, account computer system 414 delivers to the financing organization a statement of the transactions made to account 430 during that month or other second predetermined period. The statement delivery may be accomplished electronically, directly from account computer system 414 to fee computer system 412, in an electronic format readable by system 412. Alternatively, the statement may be printed on paper by account computer system 414, mailed to the financing organization maintaining fee computer system 412, and input into computer system 412. Thus, arrow 432 represents the delivery of the statement from patent or patent and trademark agency 426 or the financial institution maintaining account computer system 414 to the financing organization maintaining fee computer system 412. The statement includes second information regarding the charges, such as the authorization (and optionally authorization code) or check number, the date the charge was paid or debited, the date the charge was requested, the amount of the charge, etc.

Both fee computer system 412 and account computer system 414 are typical computer systems including one or more processors, memory, such as read-only memory (ROM) and random-access memory (RAM), one or more storage devices, such as hard disk drives (HDD), floppy disk drives (FDD), optical drives, and tape-cartridge drives, one or more input devices, such as optical character recognition devices (OCR), keyboards, and mouses, and one or more output devices, such as laser and ink jet printers, and display monitors.

In addition, because the systems preferably require electronic communication with each other and, in the case of fee computer system 412, with firm computer system 410 as well, each also includes such as means for electronic communication. This may include a modem or other communication device for communicating over a preexisting communications network such as a public telephone switched network (PTSN) or an integrated services digital network (ISDN), or a connection to the Internet. It is noted that the hardware implementation of firm computer system 410 is described in the next section.

Finally, arrow 434 represents communication between second computer subsystem 418 of firm computer system 410 and fee computer system 412 maintained by the financing organization. This communication includes the delivery of the firm invoice for the fees paid on behalf of the firm's clients by the financing organization, from the financing organization to the firm. The delivery may be electronic, such that the invoice is directly transmitted from fee computer system 412 to second computer subsystem 418. Alternatively, the invoice may be a paper invoice, mailed from the financing organization to the firm, which inputs it into second computer subsystem 418 via keyboard entry or optical character recognition (OCR). The delivery of the invoice by the financing organization is performed after fee computer system 412 has reconciled the second information regarding the charges received from patent or patent and trademark agency 426 or the financial institution maintaining account computer system 414 with the first information regarding the charges received from first computer subsystem 416.

Second computer subsystem 418 also generates a client invoice including the fee invoices generated at first computer subsystem 416, for delivery to the client. The client invoice correspond to the firm invoice such that payment by the client to the firm for the firm invoice is used as payment by the firm to the financing organization for the firm invoice. That is, once the firm receives payment for the client invoice, it is able to pay the firm invoice delivered to it by the financing organization.

Arrows 420 and 434 may both indicate electronic communication between firm computer system 410 and fee computer system 412. The arrows are indicated separately in FIG. 4 to show that each arrow represents the transmission of different data to a different computer subsystem of computer system 412. However, the arrows do not necessarily indicate that separate communications modes are used to transmit the information as represented by arrow 420 and as represented by arrow 434. That is, first computer subsystem 416 when communicating as represented by arrow 420, and second computer subsystem 418 when communicating as represented by arrow 434, may nevertheless utilize the same modem, or the same Internet connection, of firm computer system 410. Alternatively, each computer subsystem may utilize different modems, or different Internet connections.

The system architecture of FIG. 4 performs the preferred methods of the invention as follows. A charge for a requested trademark or patent fee, such as a check or an authorization for a debit from a deposit account, is requested at first computer subsystem 416. First computer subsystem 416 issues the charge, which is then delivered to patent or patent and trademark agency 426 as represented by arrow 424. On preferably a daily basis, first computer subsystem 416 sends an electronic invoice of the day's charges to second computer subsystem 418, as represented by arrow 422. Also on preferably a daily basis, first computer subsystem 416 seconds first information regarding the day's charges to fee computer system 412. Fee computer system 412 then specifies or effects the depositing of sufficient funds into account 430 to cover the charges, as represented by arrow 432. Patent or patent and trademark agency 426, upon receiving the charge as represented by arrow 424, cashes the check against account 430, or debits account 430, as represented by arrow 428.

On preferably a monthly basis, patent or patent and trademark agency 426 or the financial institution maintaining account computer system 414 sends a statement regarding that month's transactions made to account 430 to the financing organization maintaining computer system 412, as also represented by arrow 432. Fee computer system 412 reconciles the second information within the statement with the first information previously received from firm system 410, and finally sends an invoice to the firm for the month's charges, as represented by arrow 434. Second computer subsystem 418 generates a client invoice, which includes the fee invoices generated by first computer subsystem 416, and which is delivered to the client. The client's payment of this invoice is then used by the firm to pay the firm invoice, the client invoice corresponding to the firm invoice.

Figure 5:
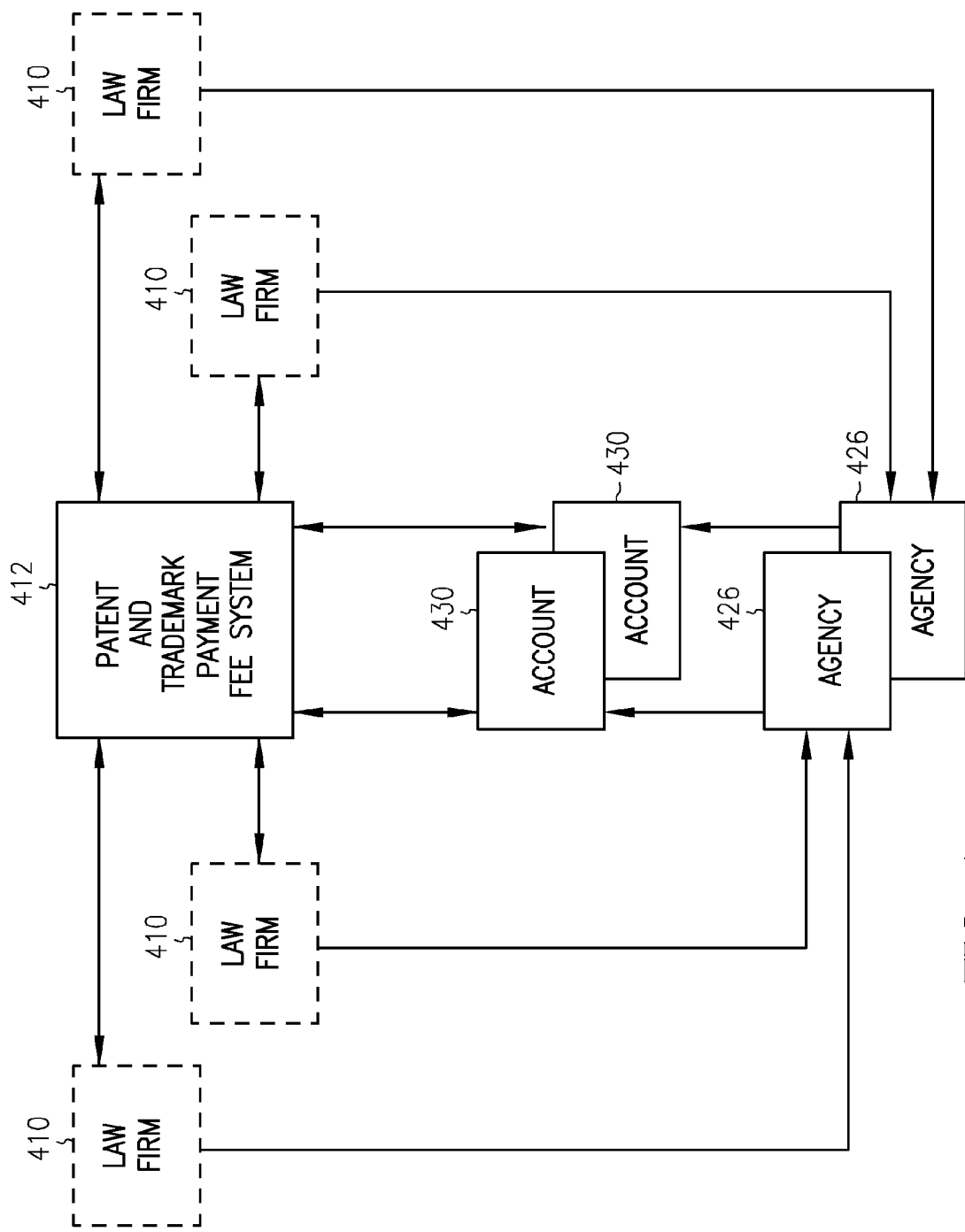
FIG. 5 shows a diagram of another exemplary system architecture in which the preferred methods of the invention may be practiced.

As has been described in conjunction with and shown in FIG. 4, the fee computer system of the financing organization interacts with one firm and one patent or patent and trademark agency. The limitation to one firm and one patent or patent and trademark agency in FIG. 4 is for purposes of clarity only, however. The invention is not so limited. Referring now to FIG. 5, a diagram of an exemplary system architecture in which the fee computer system of a financing organization handles multiple firms and patent and trademark agencies is shown. Fee computer system 412 thus receives first information from and sends firm invoices to a number of firms each maintaining a firm computer system 410. Each firm is able to send a patent or trademark filing including a charge to any of a number of patent agencies 426. Each of the patent agencies 426 is able to cash checks against one of a number of accounts 430, or to debit one of a number of accounts 430. Finally, the financing organization is able to transfer funds to any of the accounts 430.

In other words, the fee computer system of the financing organization is able to handle the advancement of fees on behalf of the clients of more than one law firm, for payment to more than one patent or patent and trademark agency. Each law firm 410, for example, may correspond with a number of different patent agencies 426, such as the USPTO, the EPO, a PCTO, etc. The financing organization may have a specific account 430 for each firm 410, or it may have a specific account 430 for each agency 426, or it may have only account 430. That is, the manner in which the financing organization maintains one or more accounts 430 to accommodate the advancement of fees on behalf of the clients of more than one firm 410 is not limited by the present invention.

An exemplary system architecture in which the preferred methods of the invention may be practiced has been described. The exemplary system architecture has been shown in detail in conjunction with one firm and one patent or patent and trademark agency in FIG. 4. The exemplary system architecture has been shown in conjunction with more than one firm and more than one patent or patent and trademark agency in FIG. 5.

Figure 6:
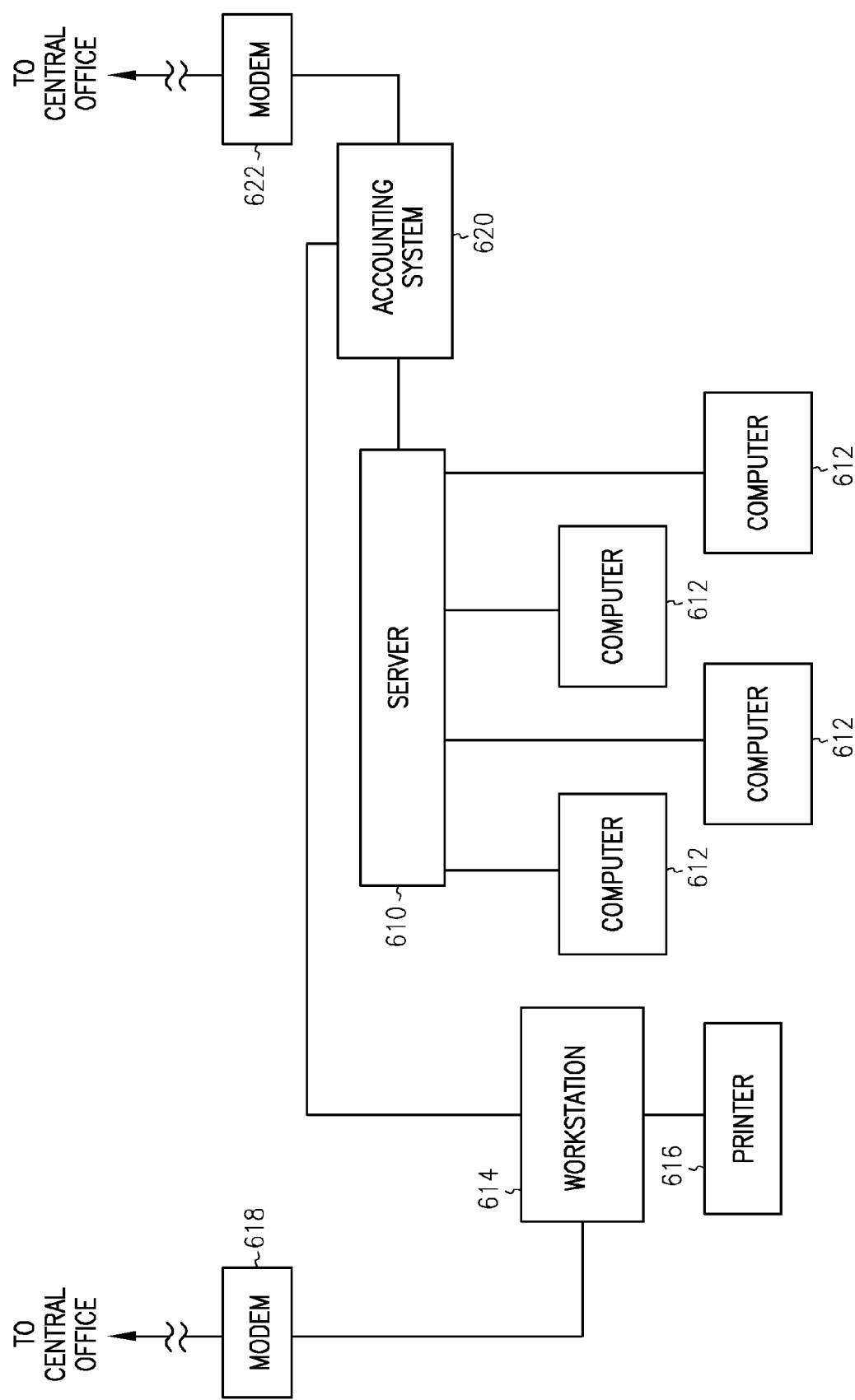
FIG. 6 shows a first exemplary hardware implementations of a firm computer system of the present invention.
Figure 7:
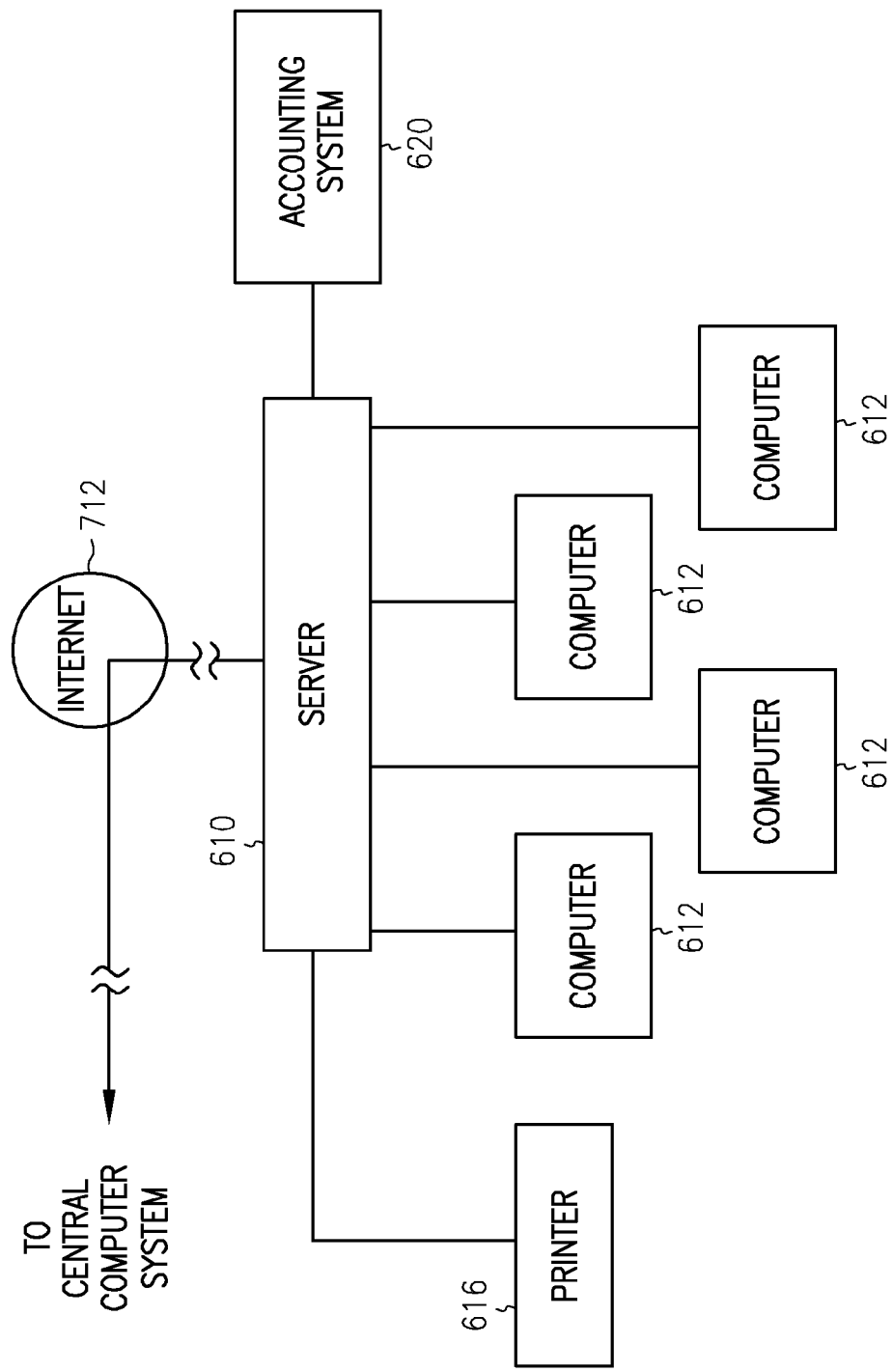
FIG. 7 shows a second exemplary hardware implementation of a firm computer system of the present invention.
Figure 8:
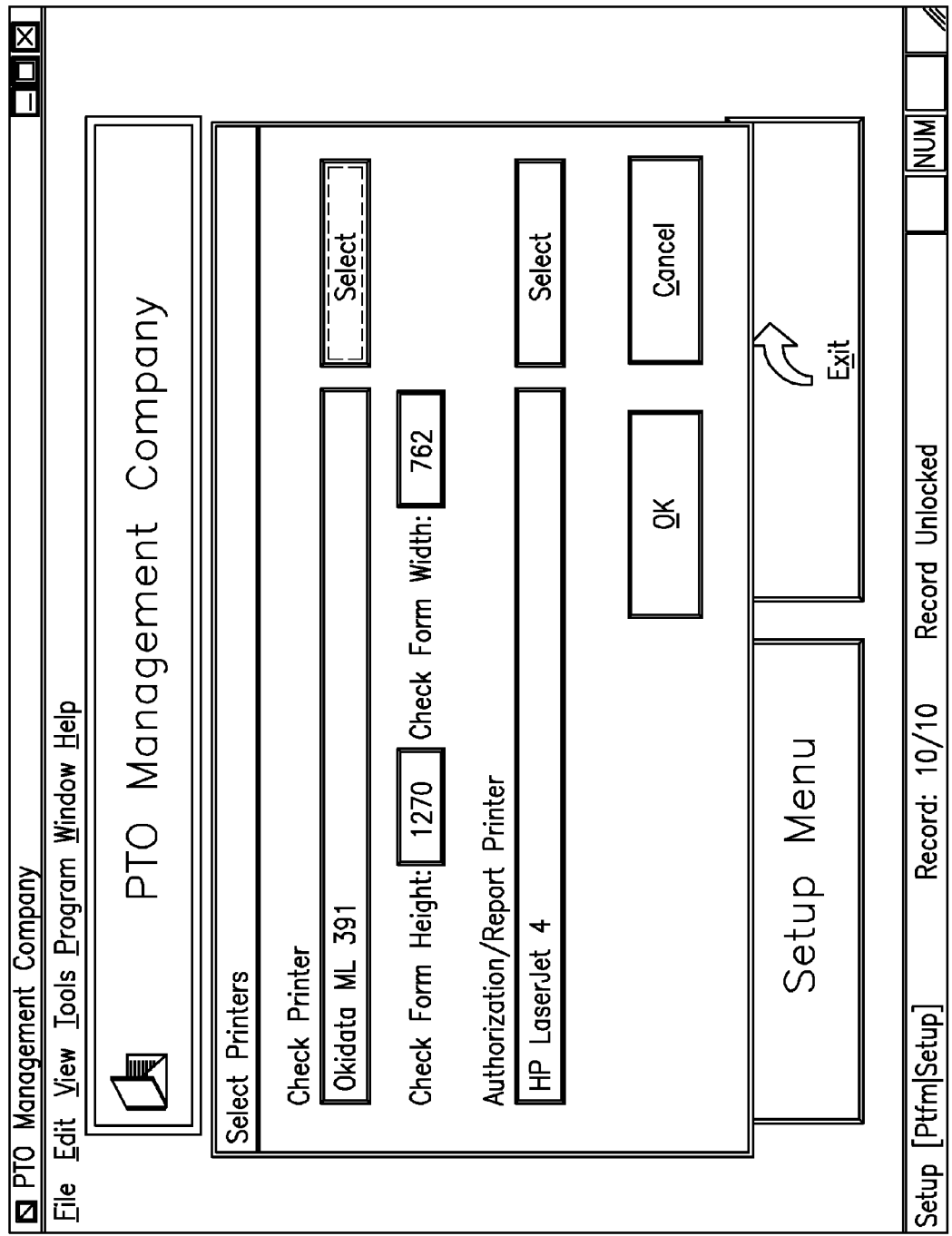
Figure 9:
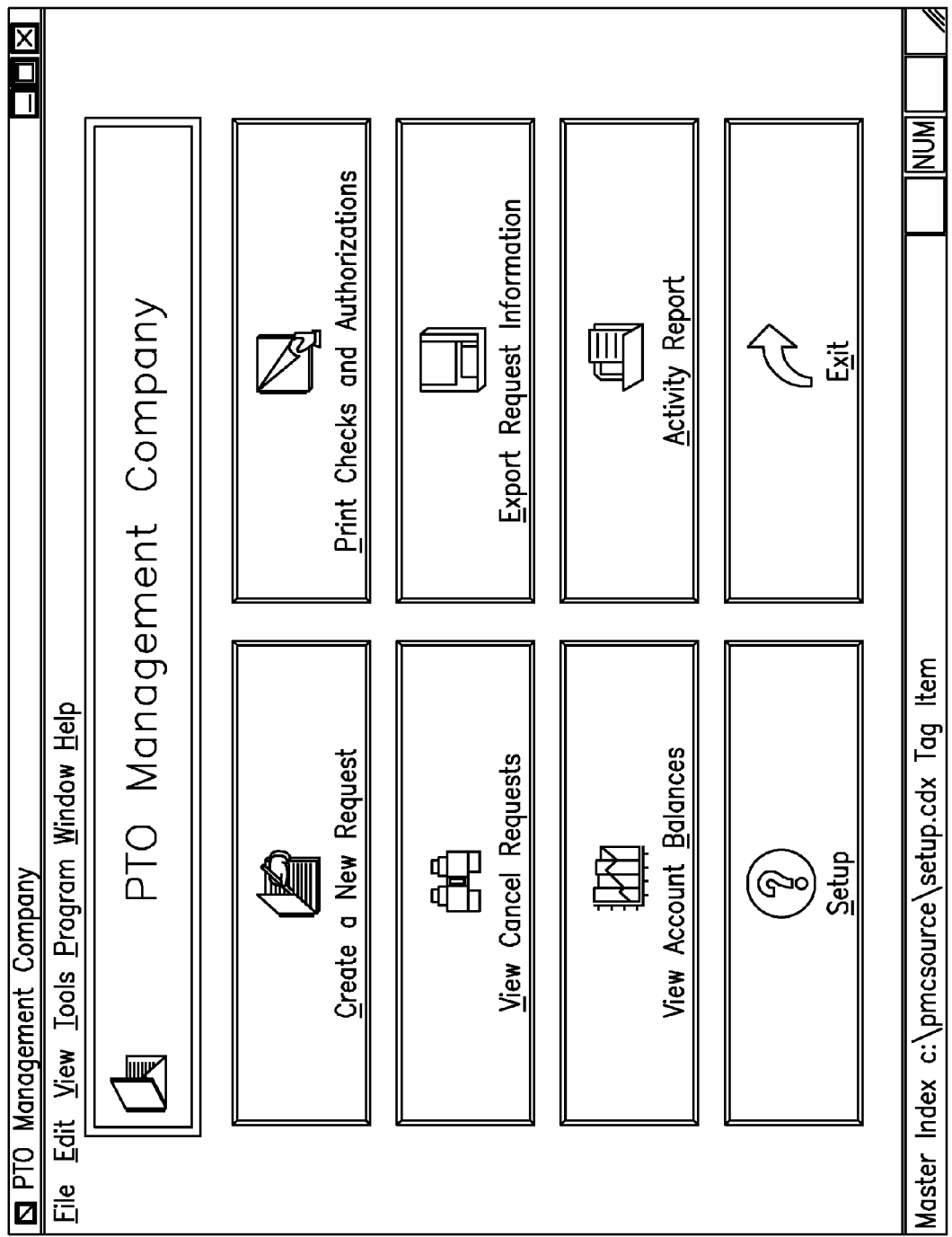
Figure 12:
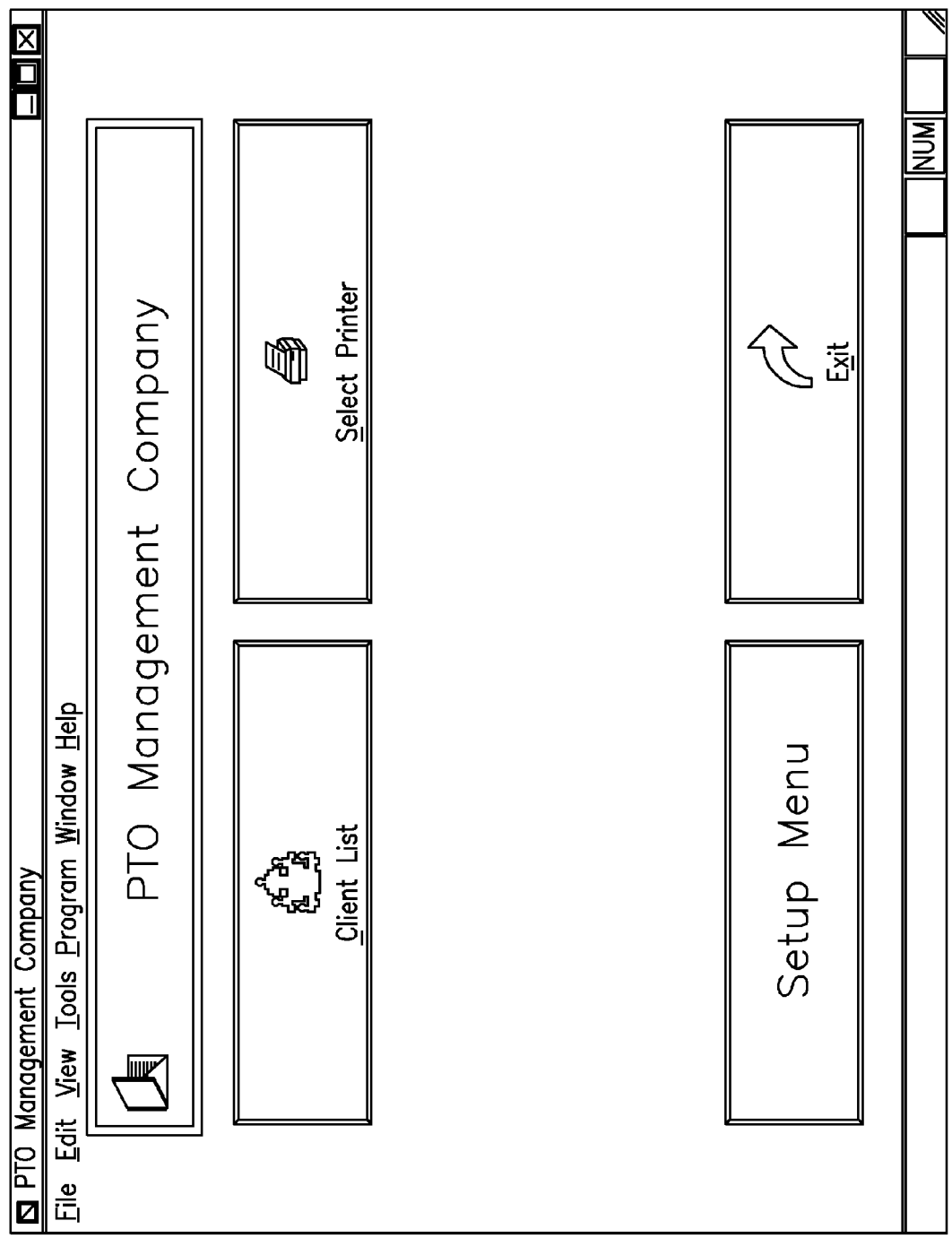
Figure 13:
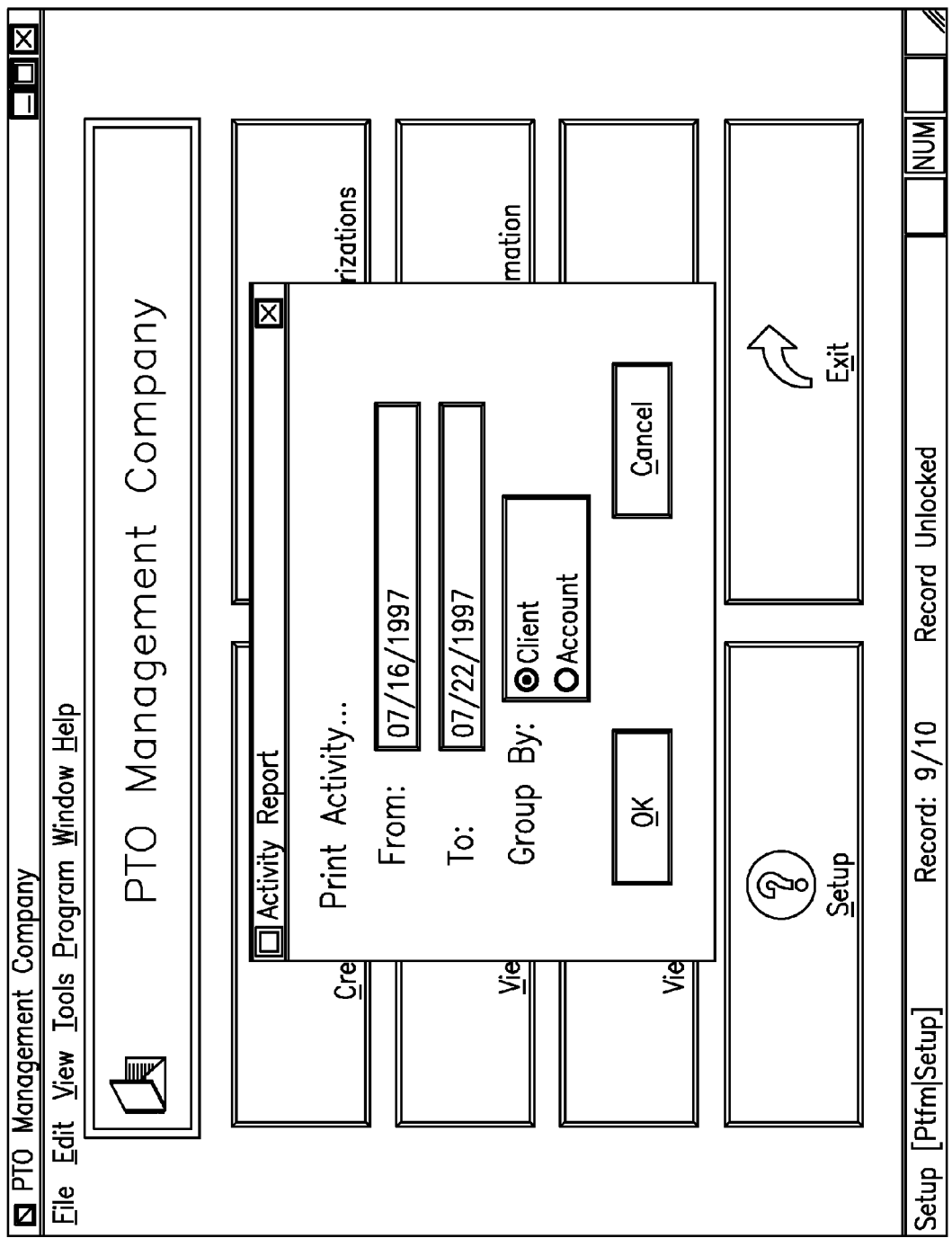
Figure 14:
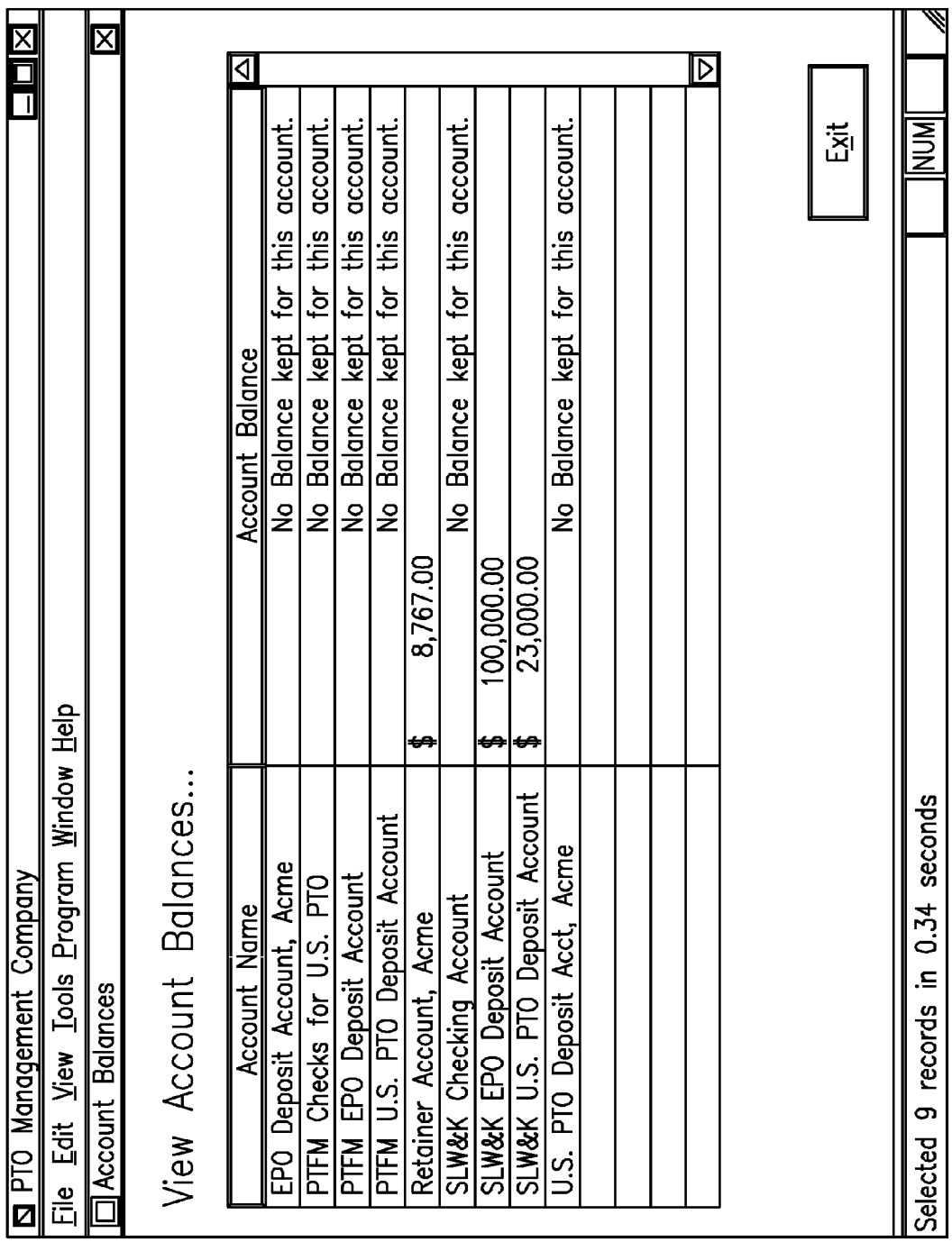
Figure 15:
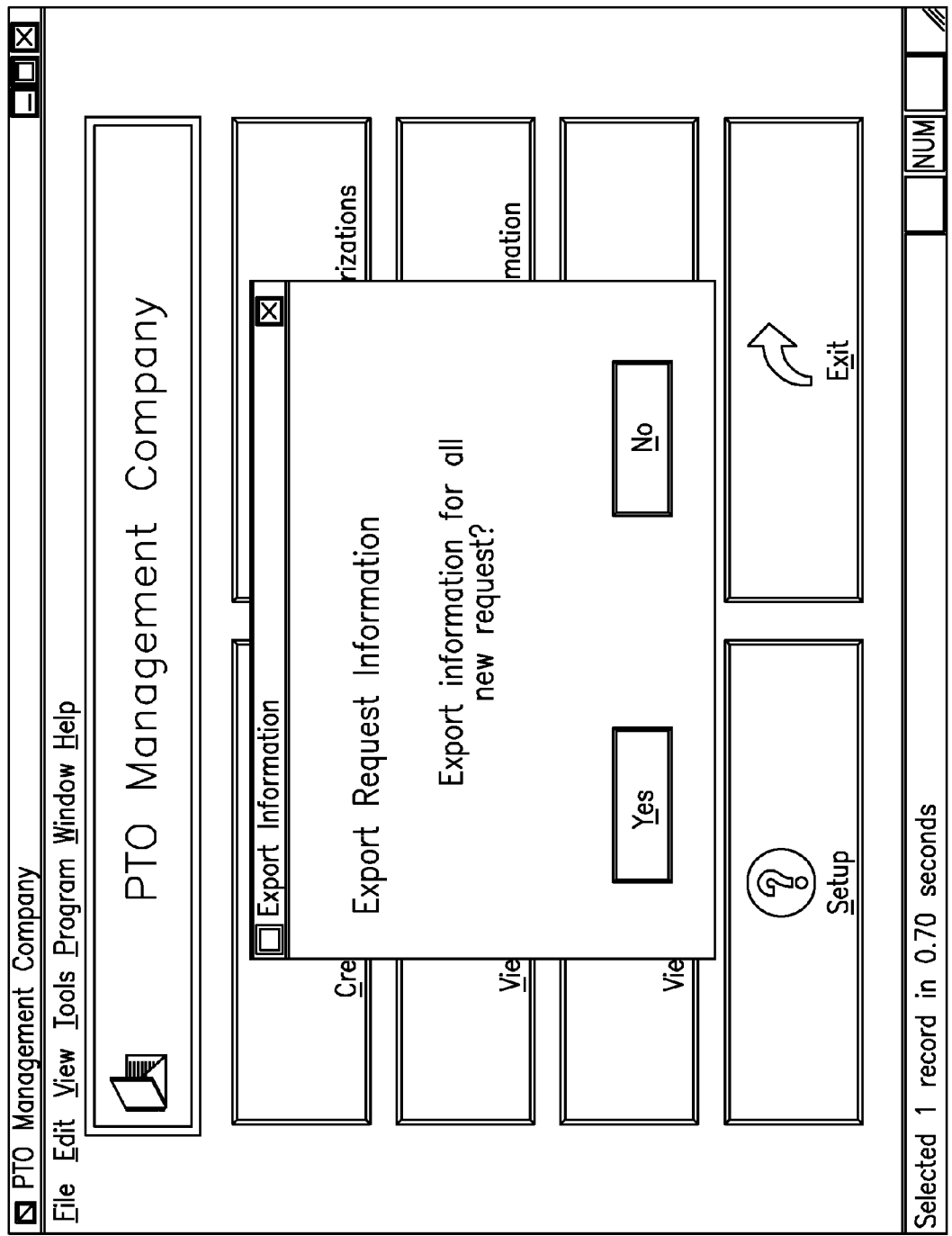
Figure 16:
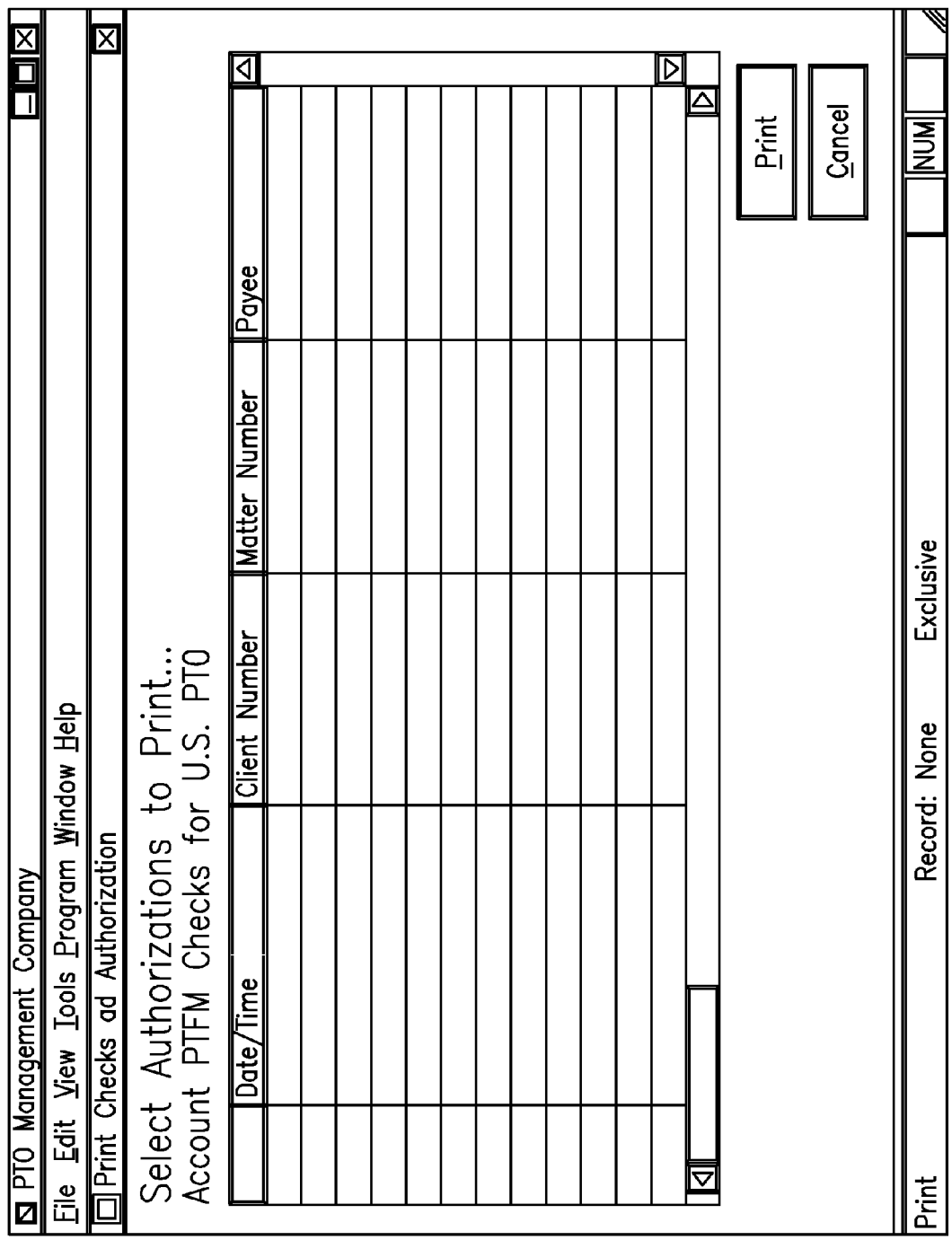

Exemplary Hardware Implementations of the Firm Computer System of the Present Invention Referring to FIG. 6 and FIG. 7, two exemplary hardware implementations of the firm computer system of the present invention are shown. In the hardware implementation of FIG. 6, the workstation at which a charge for a requested trademark or patent fee is issued is a stand-alone computer. In the hardware implementation of FIG. 7, the workstation is any computer within the firm computer system. It is noted that the hardware implementations shown in FIG. 6 and FIG. 7 are exemplary, and the invention is not so limited to either hardware implementation.

Referring specifically to FIG. 6, the firm computer system includes a local-area network (LAN) having a server 610 coupling together a plurality of computers 612. The network may be any type of network, such as an Ethernet network, a token-ring network, etc. Each of the server 610 and computers 612 includes a processor (such as an Intel Pentium processor), random-access memory (such as thirty-two megabytes of memory), read-only memory, one or more storage devices (such as a hard disk drive (HDD), a floppy disk drive (FDD), a tape cartridge drive, and an optical drive), one or more input devices (such as a keyboard, a mouse, and a scanner), and one or more output devices (such as a printer, and a display monitor). Each of the server 610 and computers 612 runs an operating system, such as a version of Microsoft Windows. The primary difference between server 610 and computers 612 is that typically server 610 is more powerful, to handle the demands of the network.

Workstation 614 is also a computer similar to computers 612. Workstation 614 is the workstation as has been described in conjunction with the preferred embodiments, at which charges are requested and issued. Workstation 614 is comprised within the first computer subsystem of the exemplary system architectures, as has been described. Workstation 614 may not be attached to server 610 like computers 612 for security reasons. That is, in a large firm environment having a number of computers 612, it may be desirable to have a separate workstation 614 so that firm personnel are forced to enter in their charge requests on a separate machine, such that the workstation 614 may be monitored by a specific firm personnel (such as an accountant, etc.).

In an alternative embodiment, charge requests may be generated at any of computers 612, but the requests are pooled at workstation 614, so that the accounting department of the firm may monitor the charges that have been requested, and finalize or approve their issuance. In this embodiment, security is maintained because no charges are issued until a central authority approves them, but convenience is provided for by permitting any user of the law firm to request a charge without having to leave a particular computer 612. Workstation 614 may itself be physically located in the firm's accounting department, the firm's docketing department, the firm's mail room, etc.

Workstation 614 is specifically shown in FIG. 6 as coupled to printer 616. Printer 616 may be a laser printer or an ink jet printer. In one embodiment of the invention, printer 616 is utilized to print checks for the requested patent and trademark fees. The checks may be printed on blank check printing stock, for ease of use and maintenance, using a special magnetic ink installed in printer 616. Such magnetic ink is commercially available. Alternatively, the checks may be preprinted as payable to a particular patent or patent and trademark agency, and the printer only prints the date, number, and amount of the fee on the check.

Workstation 614 is also specifically shown in FIG. 6 as coupled to modem 618. The invention is not limited to any particular modem 618, but in one embodiment modem 618 communicates at 28,800 baud over a PTSN, and in another embodiment communicates at 56,000 baud over an ISDN, as known within the art. Modem 618 is utilized by workstation 614 to communicate with the fee computer system, which would also have a modem communicatively compatible with modem 618.

Workstation 614 is also coupled to accounting system 620. Accounting system 620 is the accounting system as has been described in conjunction with the preferred methods that receives electronic invoices from workstation 614. Accounting system 620 is comprised within the second computer subsystem of the firm computer system as has been described in conjunction with the exemplary system architectures. Accounting system 620 is also a computer of a type such as computers 612 are. As shown, accounting system 620 is directly connected to workstation 614; however, it may also be connected to workstation 614 through server 610. Accounting system 620 is preferably connected to server 610, although this is not required. If for security reasons such connection is not desirable, then accounting system 620 need not connect to server 610.

As shown in FIG. 6, accounting system 620 is coupled to modem 622. The invention is not limited to any particular modem 622, but in one embodiment modem 622 communicates at 28,800 baud over a PTSN, and at 56,000 baud over an ISDN in another embodiment, as known within the art. Modem 622 is utilized by accounting system 620 to communicate with the fee computer system, which would also have a modem communicatively compatible with modem 622. Although as shown in FIG. 6, each of workstation 614 and accounting system 620 has a separate modem, in one embodiment, both share a single modem to communication with the fee computer system of the financing organization.

Referring next to FIG. 7, another exemplary hardware implementation of the firm computer system is shown. Like the firm computer system of FIG. 6, the firm computer system of FIG. 7 includes a server 610, a plurality of computers 612, a printer 616, and an accounting system 620. However, the firm computer system of FIG. 7 does not include a dedicated workstation 614. Rather, each of computers 612 includes functionality to serve as workstation 614. That is, each of computers 612 is amenable to input of a requested charge for a patent or trademark fee, which is then issued by the particular computer 612 and printed on printer 616 as has been described. This hardware implementation is desirable in small firms not having a large number of computers 612, and thus not having the security issues that may be present in large firms have a large number of computers 612.

In addition, communication between the firm computer system and the fee computer system of the financing organization in FIG. 7 is accomplished over the Internet, as opposed to direct modem-to-modem communication as in FIG. 6. Specifically, server 610 has a connection to the Internet 712, to which the fee computer system of the financing organization also has a connection. The invention is not limited to the manner by which the server or the fee computer system is connected to the Internet.

Two exemplary hardware implementations have been described. It is noted that the invention is not so limited to either hardware implementation. For example, the basic hardware implementation of FIG. 6, but with Internet communication to the fee computer system of the financing organization, is also amenable under the invention. For further example, the basic hardware implementation of FIG. 7, but with direct modem-to-modem communication with the fee computer system of the financing organization, is amenable under the invention as well.

Additional Functionality Provided by Alternative Embodiments

The preferred methods, exemplary system architecture, and exemplary hardware implementation of the present invention have been described. Specifically, a computerized method and system in which a patent or trademark fee for a client of a firm is charged against an account maintained by a financing organization separate from the firm has been described. It is contemplated that other functionality is provided by alternative embodiments of the invention.

In a first alternative embodiment of the invention, the firm personnel entering in the charge request at the workstation is able to flag that the requested charge should be payable against the firm's own account (either a deposit account, or by printing check cashable against the firm's account with a financial institution). This is desirable where the firm wants to finance the fee itself or believes for whatever reason that the client for which the fee is being advanced will not be able to repay the fee. In this situation, the firm desires to pay the fee itself so that it will not also have to also pay the service charge exacted by the financing organization in paying the fee on behalf of the client.

Furthermore, when the firm's own deposit account is utilized, in a second alternative embodiment of the invention, the client's fees are still financed by the financing organization, such that the financing organization deposits funds into the firm's own deposit account, and then exact a service charge against the client as before.

In a third alternative embodiment of the invention, the fee computer system of the financing organization downloads on a monthly basis, or at the end of a second predetermined period, the firm's monthly billing records, to ensure that the charges for the patent and trademark fees, along with their corresponding service charges, were properly billed to the firm's clients. This is desirable as a further measure to prevent fraud on the financing organization, and also as a service to the law firm that it is billing its clients correctly.

In a fourth alternative embodiment of the invention, the clients are billed a service charge for patent and trademark fees advanced on their behalf to a patent or patent and trademark agency according to their classification, the particular scheme of which is not limited by the invention. For example, larger or otherwise more creditworthy clients may be charged less of a service charge than smaller or otherwise less creditworthy clients for the same patent or trademark fee advanced on their behalf.

In a fifth alternative embodiment, the firm personnel inputting a requested charge for a patent or trademark fee may divide how the fee is to be paid. For example, an extension fee is occasionally paid for by the firm, not the client whose matter the fee relates to. In such instance, the firm personnel may specify that the extension fee is to debited from the firm's deposit account, or paid for by a check cashable against the firm's financial account, whereas any other fees are to be advanced by the financing organization separate from the firm, as has been described herein. For further example, additional fees may be charged to a second deposit account, to segregate errors from authorizations, and assuring payment of issue fees and other fees.

In a sixth alternative embodiment, the patent and trademark fee payment system and method described in previous sections of the detailed description is modified to submit payment to a foreign firm associated with the law firm, instead of to a patent agency. However, because payment terms to such foreign firms do not typically require immediate payment, in such an alternative embodiment, the payment to the foreign firm is submitted after a predetermined period following the request. In other aspects, however, this embodiment of the invention operates as has been described in previous sections of the detailed description. The term agency as used in this application, therefore, is meant to cover such foreign associate firms, as well as other firms and entities, in addition to patent and patent or trademark agencies such as the USPTO, the EPO, etc.

As an example of this embodiment, a law firm may request payment on June 1 for a foreign associate invoice. The financing organization would issue an authorization and commit to pay this invoice on October 30, with payment due December 30. On October 30, the system will generate a check to pay the invoice. However, the law firm may immediately invoice its client in June for the law firm's obligation to repay the financing organization on December 30. Therefore, the firm will receive payment from its client for the foreign associate invoice even prior to the finance organization issuing a charge for the foreign associate fees, which is beneficial to the firm.

In a seventh alternative embodiment, the invention provides for the capability of tracking retainer balances for the clients of a firm. Therefore, when a charge request is made, the request can denote whether the charge should be made as has been described (i.e., advanced by a financing organization, etc.), or whether the charge should be paid from the retainer balance, and the retainer balance decreased accordingly. In such an embodiment, the printing of a check may be performed a printer separate from the printer used to print checks payable against an account maintained by the financing organization, although the invention is not necessarily so limited.

In an eighth alternative embodiment, the invention enables firm personnel to receive an authorization for a charge, and then afterwards (such as one or two days after receiving the authorization and mailing the associated transmittal) request that the system print a check payable to a patent agency to deposit funds to cover the charge. For example, a firm personnel on a first day may receive an authorization code for a debit of the deposit account for the filing fee associated with a patent application to the United States Patent and Trademark Office. On the next day, this debit would be flagged by the system and called to the attention OF firm personnel who could then request that the system print a check payable to a deposit account with the patent agency to cover the debit. The deposit account may be the financing organization's or the firm's; furthermore, the check may be payable against a financial account maintained by either the financing organization or the firm. The invention is not so limited.

Software Listing

The following is a software listing of a preferred embodiment of the invention, as will be appreciated by understood by those of ordinary skill in the art. The software listing is written in Microsoft Fox Pro. In addition, FIGS. 8, 9, 10, 11, 12, 13, 14, 15, 16 and 17 show screen shots from an exemplary embodiment of the invention, while FIGS. 18, 19, 20, 21, 22 and 23 show forms and reports from an exemplary embodiment of the invention.

| | | | | | |
|---|---|---|---|---|---|
| Database: PTFM | | | | | |
| Structure for table: | | C:\PMCSOURCE\ACCOUNT.DBF | | | |
| Number of data records: | 9 | | | | |
| Date of last update: | Jul. 15, 1997 | | | | |
| Code Page: | 1252 | | | | |
| Field | Field Name Width | Dec | Type Index | Collate | Nulls |
| 1 | AC_CODE 8 | | Asc | Character Machine | No |
| 2 | AC_NAME 30 | | Asc | Character Machine | No |
| 3 | AC_CLIENTNUM.. 10 | | | Character | No |
| 4 | AC_CLIENTNAM.. 50 | | | Character | No |
| 5 | AC_ACCOUNTNU.. 20 | | | Character | No |
| 6 | AC_ACCOUNTTY.. 18 | | | Character | No |
| 7 | AC_BALANCE 12 | 2 | | Numeric | No |
| 8 | AC_NEXTCHECK 10 | | | Numeric | No |
| ** Total ** | 159 | | | | |
| Structure for table: | | C:\PMCSOURCE\ACCTTYPE.DBF | | | |
| Number of data records: | 9 | | | | |
| Date of last update: | Jun. 10, 1997 | | | | |
| Memo file block size: | 64 | | | | |
| Code Page: | 1252 | | | | |
| 1 | AT_TYPE 18 | | | Character | No |
| 2 | AT_KEEPBALAN.. 1 | | | Logical | No |
| 3 | AT_TRANSTYPE.. 4 | | | Memo | No |
| 4 | AT_PAYEES 4 | | | Memo | No |
| 5 | AT_CANEXCEED 1 | | | Logical | No |
| 6 | AT_CHARGEFEE 1 | | | Logical | No |
| 7 | AT_CHECKONLY 1 | | | Logical | No |
| 8 | AT_AUTHORIZA.. 1 | | | Logical | No |
| 9 | AT_USPTOCODE 1 | | | Logical | No |
| 10 | AT_EPOCODE 1 | | | Logical | No |
| 11 | AT_EXPORTTOP.. 1 | | | Logical | No |
| ** Total** | 35 | | | | |
| Structure for table: | | C:\PMCSOURCE\CLIENT.DBF | | | |
| Number of data records: | 4 | | | | |
| Date of last update: | Jun. 20, 1997 | | | | |
| Code Page: | 1252 | | | | |
| 1 | CL_CLIENTNUM.. | | | Character | |

| | | | | |
|---|---|---|---|---|
| | 2 | CL_NAME | Character | |
| | | 50 | | No |
| | 3 | CL_PLAN | Character | |
| | | 20 | | No |
| ** Total ** | | — | | |
| | | 81 | | |

Structure for table: C:\PMCSOURCE\DETAIL.DBF
Number of data records: 69
Date of last update: Jul. 15, 1997
Memo file block size: 64
Code Page: 1252

| Field | Field Name | Type | | |
|---|---|---|---|---|
| 1 | DE_CODE | Character | | |
| | 8 | | | No |
| 2 | DE_CLIENTNUM.. | Character | | |
| | 20 | | | No |
| 3 | DE_MATTERNUM.. | Character | | |
| | 20 | | | No |
| 4 | DE_DATETIME | DateTime | | |
| | 8 | | | No |
| 5 | DE_TRANSACTI.. | Character | | |
| | 3 | | | No |
| 6 | DE_PAYEE | Character | | |
| | 50 | | | No |
| 7 | DE_PTOCODE | Character | | |
| | 75 | | | No |
| 8 | DE_AMOUNT | Numeric | | |
| | 10 | | 2 | No |
| 9 | DE_PLUSMINUS | Numeric | | |
| | 2 | | | No |
| 10 | DE_WHO | Character | | |
| | 25 | | | No |
| 11 | DE_LOCATION | Character | | |
| | 10 | | | No |
| 12 | DE_CHECKNUMB.. | Numeric | | |
| | 10 | | | No |
| 13 | DE_NOTES | Memo | | |
| | 4 | | | No |
| 14 | DE_FEE1 | Numeric | | |
| | 8 | | 2 | No |
| 15 | DE_DATEDUE1 | Date | | |
| | 8 | | | No |
| 16 | DE_FEE2 | Numeric | | |
| | 8 | | 2 | No |
| 17 | DE_DATEDUE2 | Date | | |
| | 8 | | | No |
| 18 | DE_FEE3 | Numeric | | |
| | 8 | | 2 | No |
| 19 | DE_DATEDUE3 | Date | | |
| | 8 | | | No |
| 20 | DE_STATUS | Character | | |
| | 17 | | | No |
| 21 | DE_SELECTED | Logical | | |
| | 1 | | | No |
| 22 | DE_PRINTDATE.. | DateTime | | |
| | 8 | | | No |
| 23 | DE_EXPORTDAT.. | DateTime | | |
| | 8 | | | No |
| ** Total ** | | — | | |
| | | 328 | | |

Structure for table: C:\PMCSOURCE\PTOCODE.DBF
Number of data records: 149
Date of last update: May 16, 1997
Code Page: 1252

| | | | | |
|---|---|---|---|---|
| 1 | PT_CODE | Character | | |
| | 75 | | | No |
| 2 | PT_USPTOCODE | Logical | | |
| | 1 | | | No |
| ** Total ** | | — | | |
| | | 77 | | |

Structure for table: C:\PMCSOURCE\PATE.DBF
Number of data records: 48
Date of last update: Jun. 27, 1997
Code Page: 1252

| Field | Field Name | Type | Width | Dec | Index | Collate | Nulls |
|---|---|---|---|---|---|---|---|
| 1 | RA_PLAN | Character | 20 | | | | No |
| 2 | RA_LOWERLIMI.. | Numeric | 8 | 2 | | | No |
| 3 | RA_UPPERLIMI.. | Numeric | 8 | 2 | | | No. |
| 4 | RA_DAYSDUE1 | Numeric | 3 | | | | No |
| 5 | RA_AMOUNT1 | Numeric | 8 | 2 | | | No |
| 6 | RA_DAYSDUE2 | Numeric | 3 | | | | No |
| 7 | RA_AMOUNT2 | Numeric | 8 | 2 | | | No |
| 8 | RA_DAYSDUE3 | Numeric | 3 | | | | No |
| 9 | RA_AMOUNT3 | Numeric | 8 | 2 | | | No |
| 10 | RA_NOTALLOWE.. | Logical | 1 | | | | No |
| ** Total ** | | — | | | | | |
| | | 71 | | | | | |

Structure for table: C:\PMCSOURCE\SETUP.DBF
Number of data records: 10
Date of last update: Jul. 22, 1997
Memo file block size: 64
Code Page: 1252

| | | | | |
|---|---|---|---|---|
| 1 | SU_ITEM | Character | | |
| | 20 | | | No |
| 2 | SU_NUMBER | Numeric | | |
| | 10 | | 2 | No |
| 3 | SU_DATA | Memo | | |
| | 4 | | | No |
| ** Total ** | | — | | |
| | | 35 | | |

Structure for table: C:\PMCSOURCE\TRANTYPE.DBF
Number of data records: 6
Date of last update: Jun. 10, 1997
Code Page: 1252

| | | | |
|---|---|---|---|
| 1 | TR_TRANSACTI.. | Character | |
| | 3 | | No |
| 2 | TR_DESCRIPTI.. | Character | |
| | 20 | | No |
| 3 | TR_PLUSMINUS | Numeric | |
| | 2 | | No |
| 4 | TR_CHKACCTVA.. | Logical | |
| | 1 | | No |
| 5 | TR_AUTACCTVA.. | Logical | |
| | 1 | | No |
| 6 | TR_CHKLIMITE.. | Logical | |
| | 1 | | No |
| 7 | TR_AUTLIMITE.. | Logical | |
| | 1 | | No |
| 8 | TR_CHARGEFEE | Logical | |
| | 1 | | No |
| ** Total ** | | — | |
| | | 31 | |

Structure for table: C:\PMCSOURCE\USER.DBF

| | | | |
|---|---|---|---|
| Number of data records: | 1 | | |
| Date of last update: | May 02, 1997 | | |
| Code Page: | 1252 | | |
| 1 | US_ID 20 | Character | No |
| 2 | US_LAST 15 | Character | No |
| 3 | US_FIRST 15 | Character | No |
| 4 | US_PASSWORD 15 | Character | No |
| 5 | US_CHECKBALA.. 1 | Logical | No |
| 6 | US_VIEWREQUE.. 1 | Logical | No |
| 7 | US_CREATEREQ.. 1 | Logical | No |
| 8 | US_CANCELREQ.. 1 | Logical | No |
| 9 | US_MODIFYACC.. 1 | Logical | No |
| 10 | US_PRINTREPO.. 1 | Logical | No |
| 11 | US_EXTRACTDA.. 1 | Logical | No |
| ** Total ** | — 73 | | |

```
Program File: Z4AIN.PRG
_SCREEN.Width = 633
_SCREEN.Height = 418
_SCREEN.Icon = "opening.ico"
SET CENTURY ON
SET BELL OFF
SET CONFIRM ON
SET DELETED ON
SET MULTILOCKS ON
SET PROCEDURE TO MAIN.PRG
OPEN DATABASE PTFM
PUBLIC frmMenu, gcLoginID, gcFullName, gcLocation, gcProgName
USE Setup
SET ORDER TO Item
IF SEEK( "PROGNAME")
    gcProgName = TRIM(Setup.SU_Data)
    _SCREEN.Caption = gcProgName
ELSE
    gcProgName = "Patent & Trademark Fee Management"
ENDIF
IF SEEK( "LOGINID")
    gcLoginID = TRIM(Setup.SU_Data)
ELSE
    gcLoginID = "Unknown"
ENDIF
IF SEEK( "FULLNAME")
    gcFullName = TRIM(Setup.SU_Data)
ELSE
    gcFullName = "Unknown"
ENDIF
IF SEEK( "LOCATION")
    gcLocation = TRIM(Setup.SU_Data)
ELSE
    gcLocation = "Unknown"
ENDIF
CLOSE TABLES ALL
DO FORM Menu NAME frmMenu
READ EVENTS
*************************************
FUNCTION GetDueDate
* Finds the Monday which is the specified number of weeks after
* the date the request was made. If the request was made on a
* Monday, do not count that Monday.
LPAPAMETERS ldDate, lnNumMondays
Local lnMondayCnt
lnMondayCnt = 0
DO WHILE lnMondayCnt < lnNumMondays
    ldDate = ldDate + 1
    IF DOW(ldDate,2) = 1
        lnMondayCnt = lnMondayCnt + 1
    ENDIF
ENDDO
RETURN idDate
*************************************
FUNCTION TextDollar
PARAMETERS nNumber
LOCAL lnDollars, lnCents
lnDollars = INT(nNumber)
lnCents = (nNumber - lnDollars) * 100
RETURN TextNumeric(lnDollars) + "AND "+ STR(lnCents,2) + "/100 DOLLARS"
*************************************
FUNCTION TextNumeric
PARAMETERS nNumber
LOCAL lcString, lnWorkNurnber
lnWorkNumber = nNumber
lcString = " "
IF lnWorkNumber >= 1000000
    lcString = TextNumeric (lnWorkNumber/1000000) + "Million"
    lnWorkNumber = lnWorkNumber –
(INT (lnWorkNumber/1000000) *1000000)
ENDIF
IF lnWorkNumber >= 1000
    lcString = lcString + TextNumeric(lnWorkNumber/1000) + "Thousand"
    lnWorkNumber = lnWorkNumber – (INT(lnWorkNumber/1000) *1000)
ENDIF
DO CASE
CASE lnWorkNumber >= 900
    lcString = lcString + "Nine Hundred "
    lnWorkNumber = lnWorkNumber – 900
CASE lnWorkNumber >= 800
    lcString = lcString + "Eight Hundred"
    lnWorkNumber = lnWorkNumber – 800
CASE lnWorkNumber >= 700
    lcString = lcString + "Seven Hundred"
    lnWorkNumber = lnWorkNumber – 700
CASE lnWorkNumber >= 600
    lcString = lcString + "Six Hundred"
    lnWorkNumber = lnWorkNumber – 600
CASE lnWorkNumber >= 500
    lcString = lcString + "Five Hundred"
    lnWorkNumber = lnWorkNumber – 500
CASE lnWorkNumber >= 400
    lcString = lcString + "Four Hundred"
    lnWorkNumber = lnWorkNumber – 400
CASE lnWorkNumber >= 300
    lcString = lcString + "Three Hundred"
    lnWorkNumber = lnWorkNumber – 300
CASE lnWorkNumber >= 200
    lcString = lcString + "Two Hundred"
    lnWorkNumber = lnWorkNumber – 200
CASE lnWorkNumber >= 100
    lcString = lcString + "One Hundred"
    lnWorkNumber = lnWorkNumber – 100
END CASE
DO CASE
CASE lnWorkNumber >= 90
    lcString = lcString + "Ninety"
    lnWorkNumber = lnWorkNumber – 90
CASE lnWorkNumber >= 80
    lcString = lcString + "Eighty"
    lnWorkNumber = lnWorkNumber – 80
CASE lnWorkNumber >= 70
    lcString = lcString + "Seventy"
    lnWorkNumber = lnWorkNumber – 70
CASE lnWorkNumber >= 60
    lcString = lcString + "Sixty"
    lnWorkNumber = lnWorkNumber – 60
CASE lnWorkNumber >= 50
    lcString = lcString + "Fifty"
```

-continued

```
    lnWorkNumber = lnWorkNumber −50
CASE lnWorkNumber >= 40
    lcString = lcString + "Forty"
    lnWorkNumber = lnWorkNumber −40
CASE lnWorkNumber >= 30
    lcString = lcString + "Thirty"
    lnWorkNumber = lnWorkNumber − 30
CASE lnWorkNumber >= 20
    lcString = lcString + "Twenty"
    lnWorkNumber = lnWorkNumber − 20
CASE lnWorkNumber >= 19
    lcString = lcString + "Nineteen"
    lnWorkNumber = lnWorkNumber − 19
CASE lnWorkNumber >= 18
    lcString = lcString + "Eighteen"
    lnWorkNumber = lnWorkNumber − 18
CASE lnWorkNumber >= 17
    lcString = lcString + "Seventeen"
    lnWorkNumber = lnWorkNumber − 17
CASE lnWorkNumber >= 16
    lcString = lcString + "Sixteen"
    lnWorkNumber = lnWorkNumber − 16
CASE lnWorkNumber >= 15
    lcString = lcString + "Fifteen"
    lnWorkNumber = lnWorkNumber − 15
CASE lnWorkNumber >= 14
    lcString = lcString + "Fourteen"
    lnWorkNumber = lnWorkNumber − 14
CASE lnWorkNumber >= 13
    lcString = lcString + "Thirteen"
    lnWorkNumber = lnWorkNumber − 13
CASE lnWorkNumber >= 12
    lcString = lcString + "Twelve"
    lnWorkNumber = lnWorkNumber − 12
CASE lnWorkNum.ber >= 11
    lcString = lcString + "Eleven"
    lnWorkNumber = lnWorkNumber − 11
CASE lnWorkNumber >= 10
    lcString = lcString + "Ten"
    lnWorkNumber = lnWorkNumber − 10
END CASE
DO CASE
CASE lnWorkNumber >= 9
    lcString = lcString + "Nine"
    lnWorkNumber = lnWorkNumber − 9
CASE lnWorkNumber >= 8
    lcString = lcString + "Eight"
    lnWorkNumber = lnWorkNumber − 8
CASE lnWorkNumber >= 7
    lcString = lcString + "Seven"
    lnWorkNumber = lnWorkNumber − 7
CASE lnWorkNumber >= 6
    lcString = lcString + "Six"
    lnWorkNumber = lnWorkNumber − 6
CASE lnWorkNumber = 5
    lcString = lcString + "Five"
    lnWorkNumber = lnWorkNumber − 5
CASE lnWorkNumber >= 4
    lcString lcString + "Four"
    lnWorkNumber = lnWorkNumber − 4
CASE lnWorkNumber >= 3
    lcString = lcString + "Three"
    lnWorkNumber = lnWorkNumber − 3
CASE lnWorkNumber >= 2
    lcString = lcString + "Two"
    lnWorkNumber = lnWorkNumber − 2
CASE lnWorkNumber >= 1
    lcString = lcString + "One"
    lnWorkNumber = lnWorkNumber − 1
END CASE
IF EMPTY(lcString)
    lcString = "No"
ENDIF
RETURN lcString
```

CONCLUSION

An improved method and system in which a patent or trademark fee for a client of a firm is charged against an account maintained by a financing organization separate from the firm has been described. In particular, preferred methods, exemplary system architectures, and exemplary hardware implementations of the present invention have been described.

It is noted that as various computer systems have been described in relation to first information, second information, accounts, etc., it is assumed in such description that the computer systems do not directly manipulate the first information, second information, accounts, etc., but rather manipulate data representing the first information, second information, accounts, etc., as those of ordinary skill within the art will appreciate.

Furthermore, although specific embodiments have been illustrated and described, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

I claim:

1. A computer-implemented method for managing patent and trademark fees comprising:
   inputting identification information for a patent or trademark matter of a client of a law firm and a requested fee associated with the matter for payment to an agency as data representing the identification information into a computer system;
   deducting a charge for the requested fee against a client account maintained at least in part by an organization separate from the law firm for the client, the client account initially funded by the client such that the client account has a positive balance;
   the organization generating a fee invoice to the law firm for the requested fee and transmitting the fee invoice to an accounting computer system used by the law firm;
   generating a client invoice from the accounting computer system including a charge to the client for payment of the requested fee, wherein the payment of the requested fee is used to replenish the client account maintained by the organization, wherein the client invoice corresponds to the fee invoice to the law firm such that payment by the client to the law firm for the client invoice provides funds to replenish the client account; and
   replenishing the client account with the funds collected from payment of the client invoice for the requested fee.

2. The method of claim 1, further comprising:
   receiving notice of an event for the matter of the client of the firm that will require a second fee associated with the matter for payment to the agency by a due date; and
   generating a second client invoice including a charge for the requested fee to pre-fund the client account maintained by the organization such that upon payment by the client prior to the due date the client account has a sufficient positive balance to cover the second fee.

3. The method of claim 2, wherein the charge included on the second client invoice for the requested fee is less than the requested fee, the client account having a positive balance less than the requested fee.

4. The method of claim 2, wherein generating the second client invoice comprises generating the second client invoice at an accounting computer system of the firm.

5. The method of claim 2, wherein generating the second client invoice comprises:
- generating the charge for the requested fee at a fee computer system of the organization;
- transmitting data regarding the charge from the fee computer system to an accounting computer system of the firm; and
- generating the second client invoice at the accounting computer system.

6. The method of claim 2, wherein receiving notice of the event comprises:
- receiving notice of the event at an accounting computer system of the firm; and
- transmitting data regarding the event from the accounting computer system to a fee computer system of the organization.

7. The method of claim 1, further comprising tracking a payment made by the client as covering one of an already made charge for a requested fee associated with a matter for payment to the agency and a charge to be made for a requested fee associated with a matter for payment to the agency.

8. The method of claim 7, further comprising issuing a refund to the client for regular payment made thereby for charges to be made requested fees associated with a matter for payment to the agency.

9. The method of claim 1, wherein payment made by the client comprises a charging of one of a credit card and a charge card of the client.

10. The method of claim 9, wherein the charging is automatic.

11. The method of claim 9, wherein the one of the credit card and the charge card comprises one of a Visa card, a MasterCard card, an American Express card, an Optima card, and a Discover card.

12. The method of claim 9, wherein the one of the credit card and the charge card of the client is sponsored by the organization.

13. The method of claim 9, wherein the one of the credit card and the charge card of the client is issued by the organization.

14. The method of claim 1, further comprising:
- computing interest on a positive balance of the client account to be paid to the client;
- determining whether on average the client account has a positive balance; and
- upon determining that on average the client account has a positive balance, providing for no cost issuance of the charge for the requested fee for transmittal to the agency.

15. The method of claim 1, further comprising:
- transmitting electronically data representing first information regarding the charge for the requested fee from the computer system to a fee computer system maintained by the organization;
- inputting second information regarding the charge received from an external source as data representing the second information into the fee computer system; and
- reconciling electronically the data representing the first information regarding the charge with the data representing the second information regarding the charge at the fee computer system.

16. The method of claim 15, further comprising:
- generating data representing a fee invoice including the charge at the computer system and electronically transmitting the data representing the fee invoice to an accounting computer system maintained by the firm;
- generating a firm invoice including the charge at the fee computer system for delivery to the firm; and
- wherein the client invoice corresponds to the firm invoice such that payment by the client to the firm for the client invoice is used as payment by the firm to the organization for the firm invoice.

* * * * *